Nov. 29, 1966   C. M. SCHOTT   3,288,089
WAFER CUTTING APPARATUS AND METHOD
Filed Aug. 30, 1962   21 Sheets-Sheet 1

INVENTOR.
CHARLES M. SCHOTT
BY
ATTORNEYS.

Nov. 29, 1966  C. M. SCHOTT  3,288,089
WAFER CUTTING APPARATUS AND METHOD
Filed Aug. 30, 1962  21 Sheets-Sheet 2

INVENTOR.
CHARLES M. SCHOTT
BY
ATTORNEYS

Nov. 29, 1966  C. M. SCHOTT  3,288,089
WAFER CUTTING APPARATUS AND METHOD
Filed Aug. 30, 1962  21 Sheets-Sheet 3

INVENTOR.
CHARLES M. SCHOTT
BY
ATTORNEYS

Nov. 29, 1966  C. M. SCHOTT  3,288,089
WAFER CUTTING APPARATUS AND METHOD
Filed Aug. 30, 1962  21 Sheets-Sheet 6

INVENTOR.
CHARLES M. SCHOTT
BY
ATTORNEYS

Nov. 29, 1966 C. M. SCHOTT 3,288,089
WAFER CUTTING APPARATUS AND METHOD
Filed Aug. 30, 1962 21 Sheets-Sheet 7

INVENTOR.
CHARLES M. SCHOTT
BY
ATTORNEYS

Nov. 29, 1966 C. M. SCHOTT 3,288,089
WAFER CUTTING APPARATUS AND METHOD
Filed Aug. 30, 1962 21 Sheets-Sheet 8

INVENTOR.
CHARLES M. SCHOTT
BY
ATTORNEYS

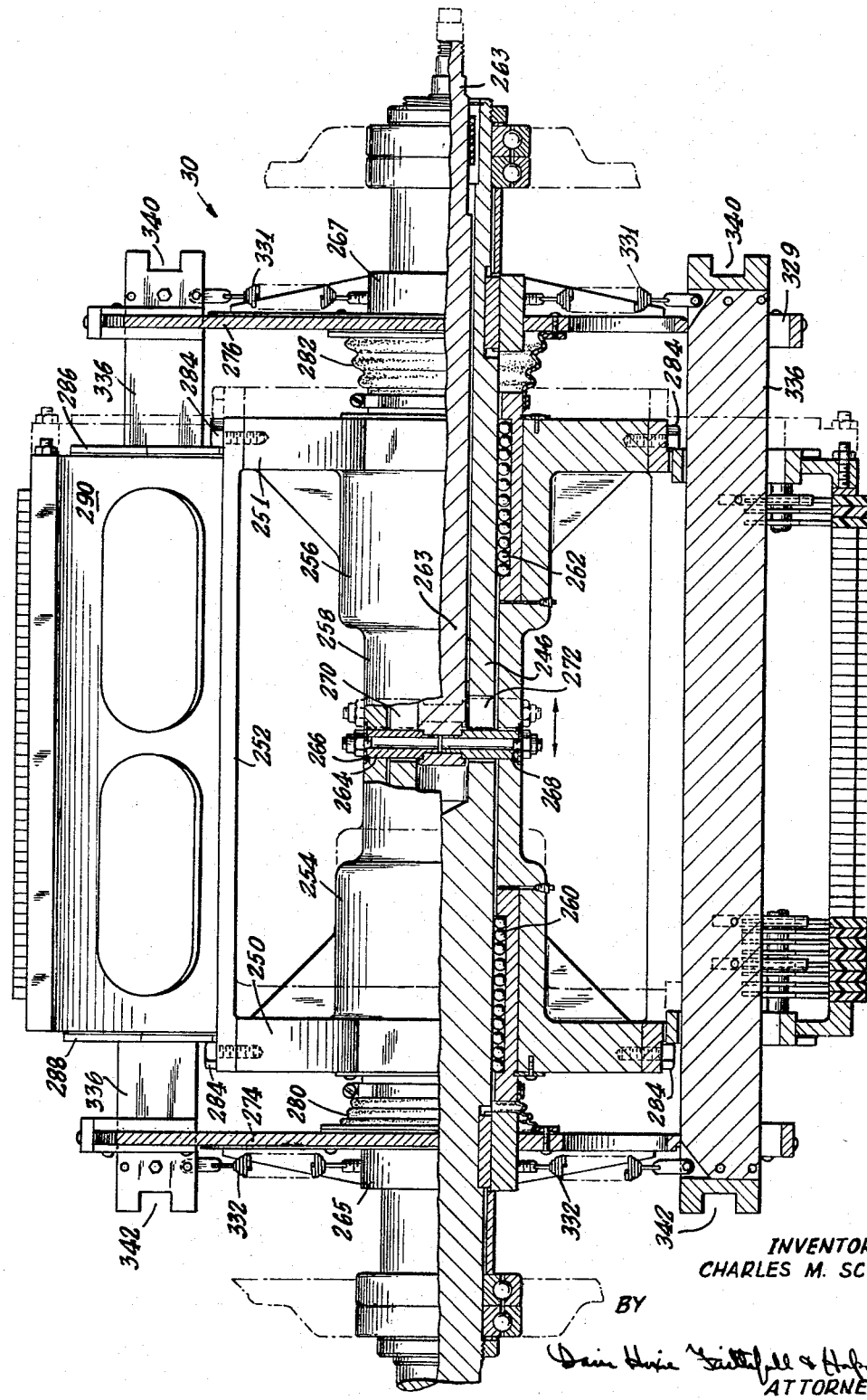

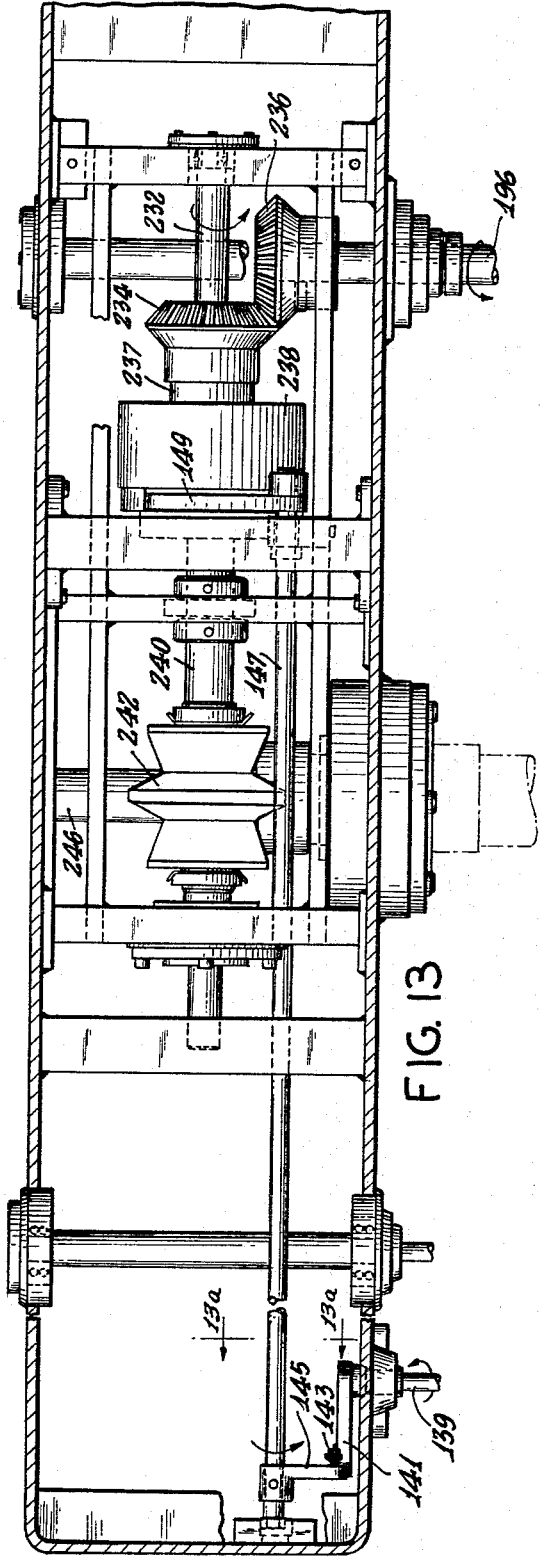
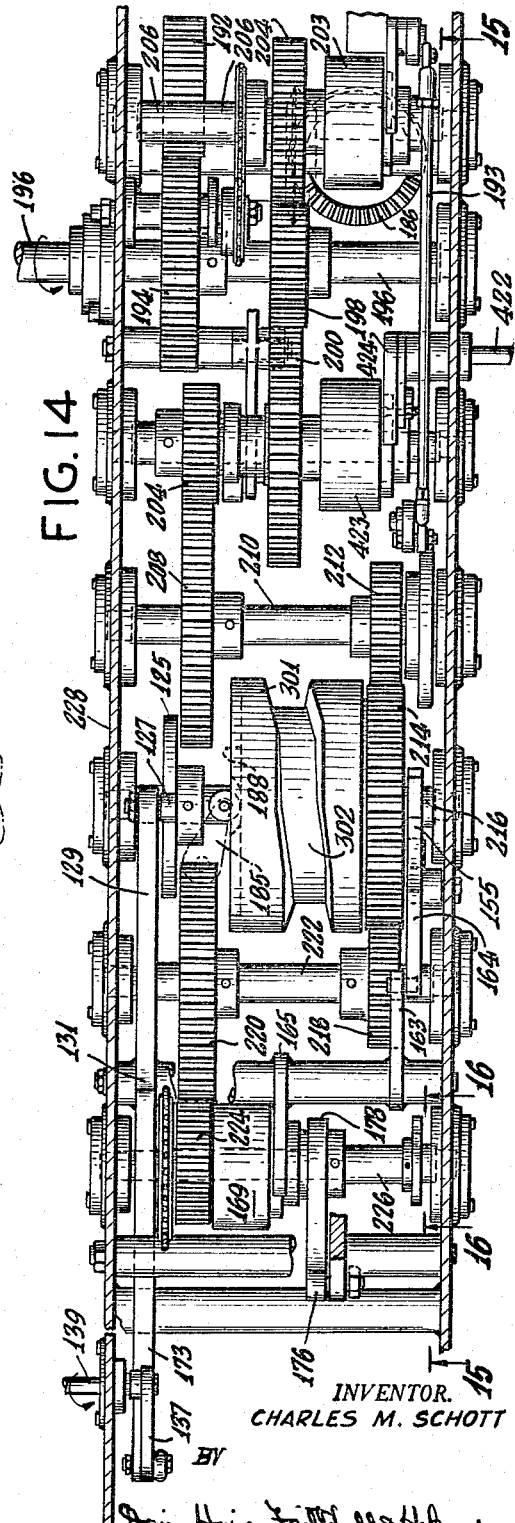

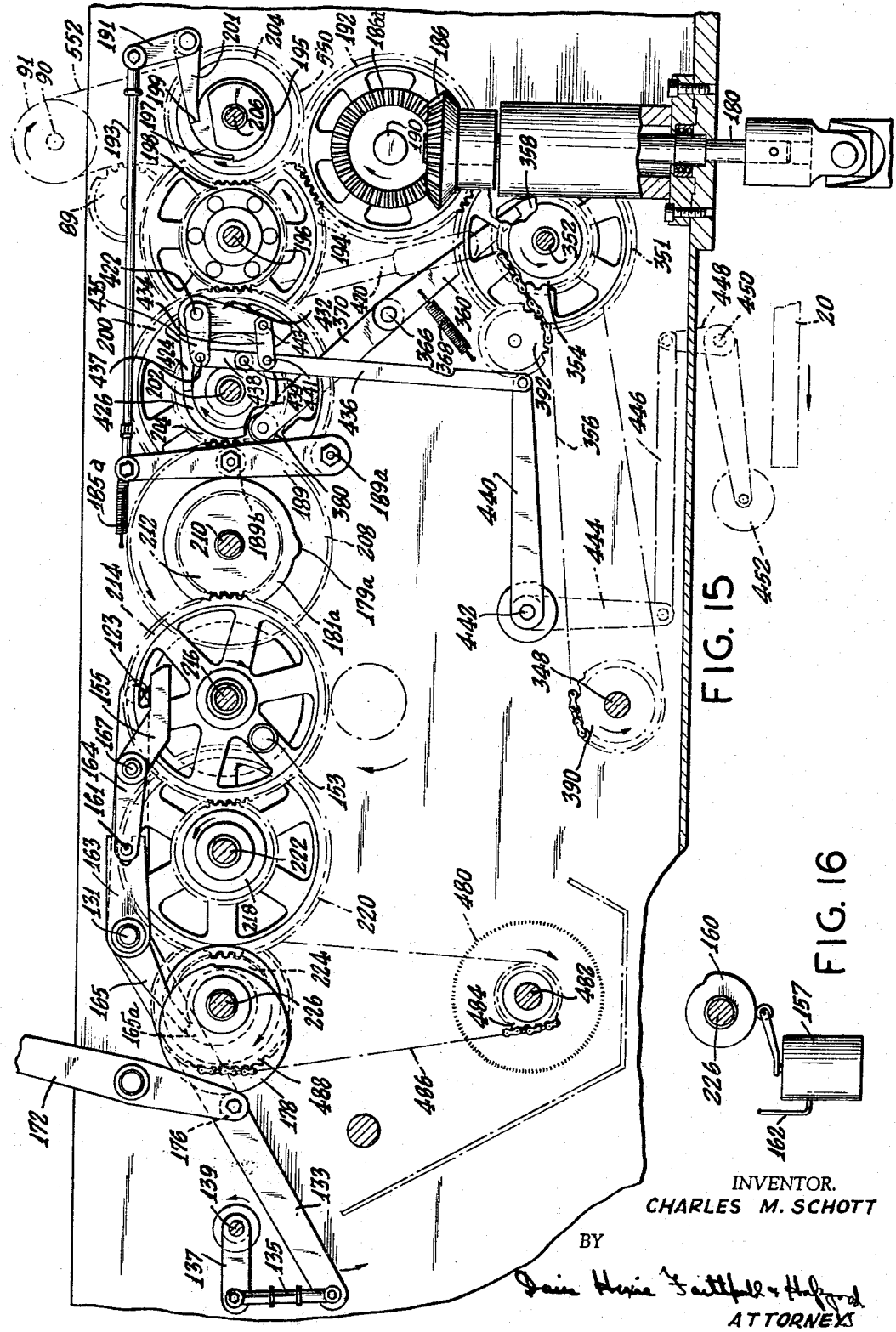

Nov. 29, 1966  C. M. SCHOTT  3,288,089
WAFER CUTTING APPARATUS AND METHOD
Filed Aug. 30, 1962  21 Sheets-Sheet 12

INVENTOR.
CHARLES M. SCHOTT
BY
ATTORNEYS

INVENTOR.
CHARLES M. SCHOTT
BY
ATTORNEYS

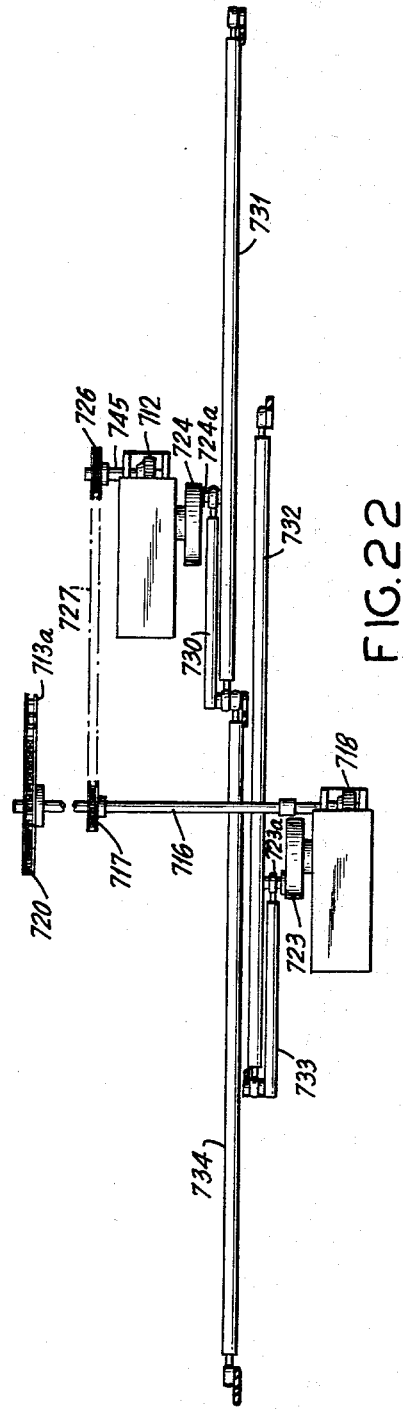

Nov. 29, 1966  C. M. SCHOTT  3,288,089
WAFER CUTTING APPARATUS AND METHOD
Filed Aug. 30, 1962  21 Sheets-Sheet 17

INVENTOR.
CHARLES M. SCHOTT
BY
ATTORNEYS

Nov. 29, 1966  C. M. SCHOTT  3,288,089
WAFER CUTTING APPARATUS AND METHOD
Filed Aug. 30, 1962  21 Sheets-Sheet 18

INVENTOR.
CHARLES M. SCHOTT
BY
ATTORNEYS

Nov. 29, 1966    C. M. SCHOTT    3,288,089
WAFER CUTTING APPARATUS AND METHOD
Filed Aug. 30, 1962    21 Sheets-Sheet 19

INVENTOR.
CHARLES M. SCHOTT
BY
ATTORNEYS

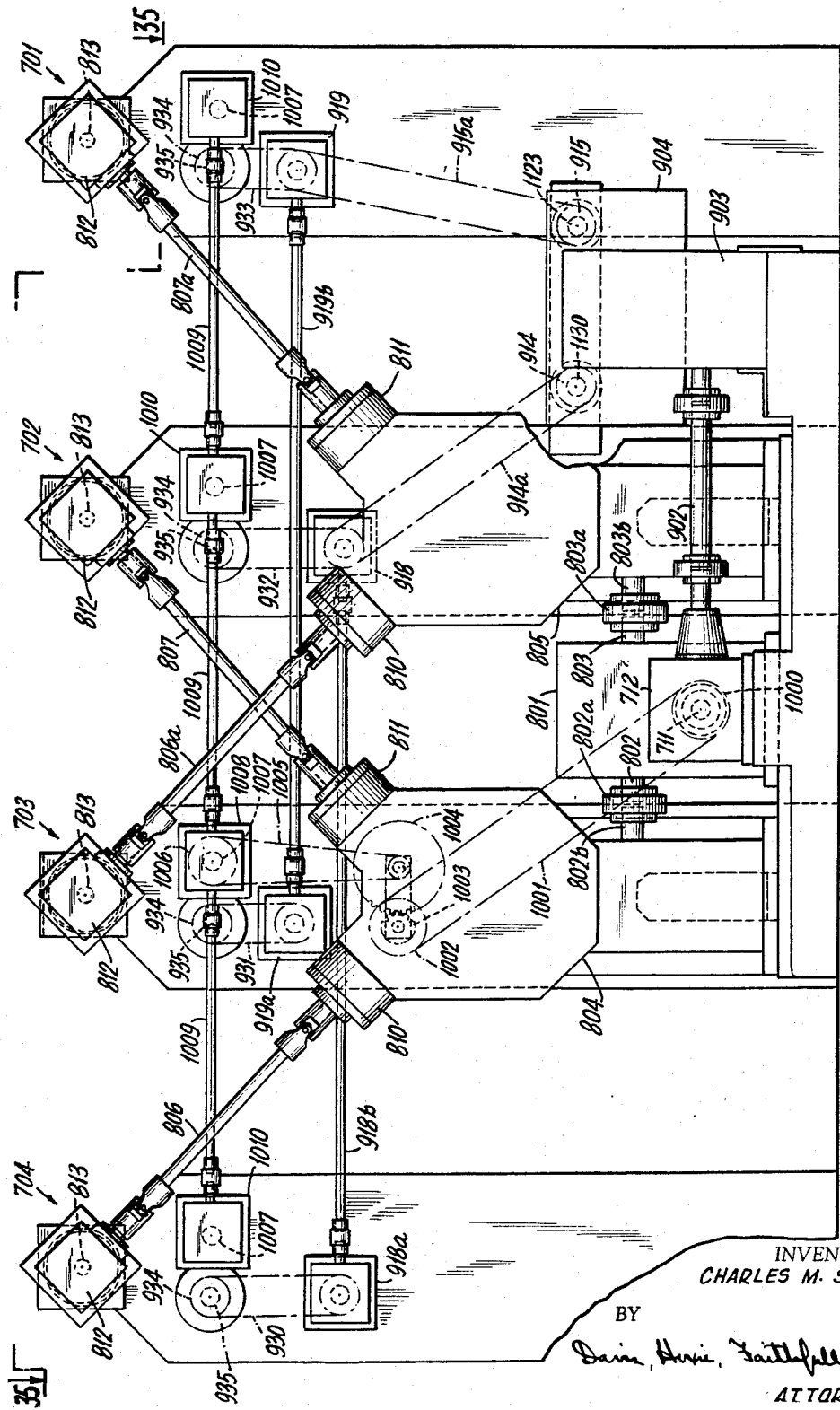

Nov. 29, 1966 C. M. SCHOTT 3,288,089
WAFER CUTTING APPARATUS AND METHOD
Filed Aug. 30, 1962 21 Sheets-Sheet 21
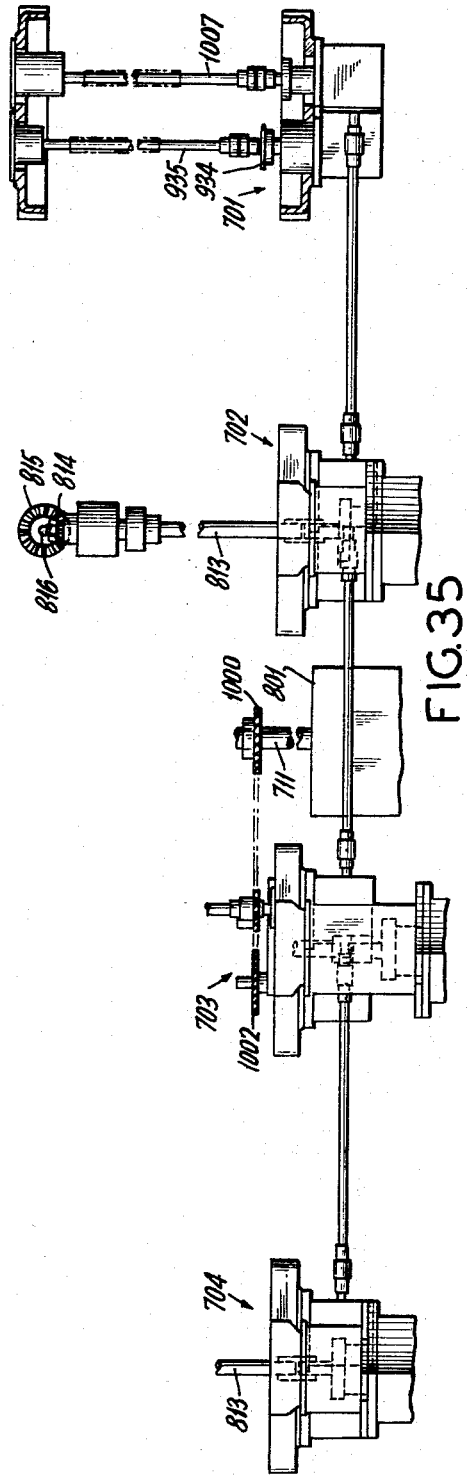
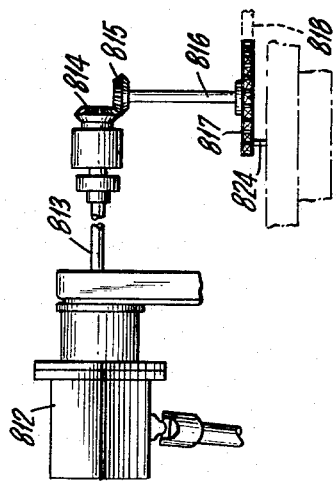
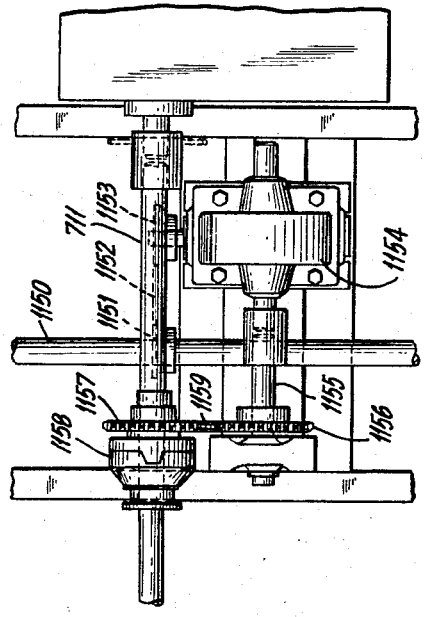
INVENTOR.
CHARLES M. SCHOTT
BY
ATTORNEYS

United States Patent Office 3,288,089
Patented Nov. 29, 1966

3,288,089
WAFER CUTTING APPARATUS AND METHOD
Charles M. Schott, Brookside, N.J., assignor to Mars, Incorporated, Hackettstown, N.J., a corporation of Delaware
Filed Aug. 30, 1962, Ser. No. 220,955
13 Claims. (Cl. 107—69)

This application is a continuation-in-part of my prior application, Serial No. 43,356, filed July 18, 1960, now abandoned.

This invention relates to the manufacture of coated pastry confections and particularly to apparatus and methods for cutting a slab of pastry or other material into pieces of desired size and depositing the pieces in mold cavities to receive a coating, such as chocolate.

The principal objects of the invention are, first, to minimize crumbling and breakage losses from the cutting, feeding, mold insertion and other handling of such fragile materials while performing those operations mechanically rather than manually, second, to accomplish the manufacturing operations at high speed, third, to enhance the precision of manufacturing operations of that character, especially the steps of cutting and mold insertion, and, finally, to produce coated confection pieces having cross sectional dimensions which are consistently uniform, from piece to piece, characterizing a confection of high quality, with no pieces showing thin coatings at the edges or elsewhere.

In the drawings:

FIGS. 3a and 3b are detail plan and elevation views, respectively, of details of the mold conveyor mechanism;

FIG. 5 is an elevation view looking from the bottom of FIG. 4;

FIG. 5a is a detail vertical section on the line 5a—5a of FIG. 5;

FIG. 8a is a vertical section of the platen showing it in mid position;

FIG. 8b is a vertical section of the platen showing it in lowermost position;

FIG. 12 is a vertical section through the drum mechanism on the line 12—12 of FIG. 11;

FIG. 13 is a horizontal section of the drive mechanism in the left side gear box, taken on the line 13—13 of FIG. 5;

FIG. 13a is an enlarged section taken on line 13a—13a of FIG. 13 showing link 143;

FIG. 14 is a horizontal section of the drive mechanism in the right side gear box, taken on the line 14—14 of FIG. 5;

FIG. 15 is a vertical section of the right side drive mechanism, taken on the line 15—15 of FIG. 14;

FIG. 16 is a detail vertical section taken on the line 16—16 of FIG. 14;

FIG. 18a is a section through FIG. 18 on line 18a—18a showing the spacer blocks;

FIG. 22 is a detailed horizontal section on the line 22—22 of FIG. 20;

FIG. 23 is a right side end view of a part of FIG. 22;

FIG. 24 is a horizontal section on line 24—24 of FIG. 21;

FIG. 33 is an elevation view of the machine looking at the depositing side of the apparatus, the opposite of FIG. 20;

FIG. 34 is a plan view of the main power supply for the molding machine;

FIG. 35 is a horizontal section on line 35—35 of FIG. 33; and

FIG. 36 is a partial schematic view showing the slide drawing gear system.

A description of one embodiment of my invention follows.

1. THE CONFECTION AND GENERAL LAYOUT OF THE MACHINE

Figure 1:
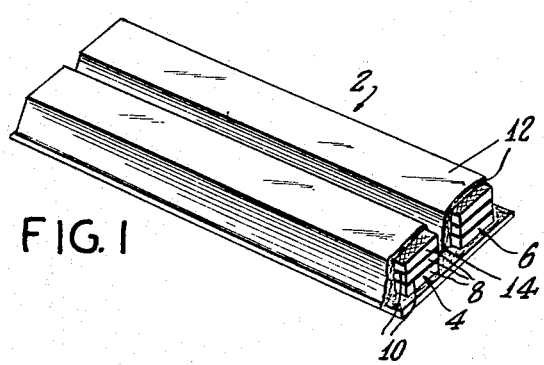
FIG. 1 is a perspective view of one of the many kinds of finished confection that may be made according to my invention.

FIG. 1 shows at 2 one kind of finished confection the machine is adapted to make. The confection is made of two pieces or fingers 4 and 6, each of which is of pastry and may be composed, as indicated, of two or more layers 8 of wafer material sandwiched with a filling 10. A chocolate coating 12 encases and envelops both wafer fingers, which are connected by the chocolate web 14.

Figure 1A:
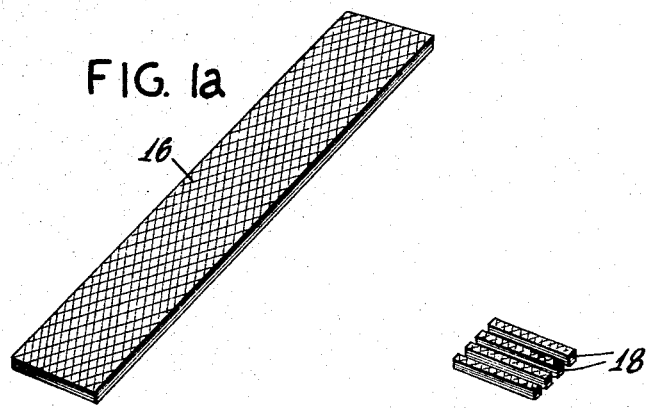
FIG. 1a is a perspective view of a wafer slab to be cut into individual pieces, or fingers, for use as the center or filling in the coated confection.
Figure 1B:
FIG. 1b shows the cut pieces.
Figure 2:
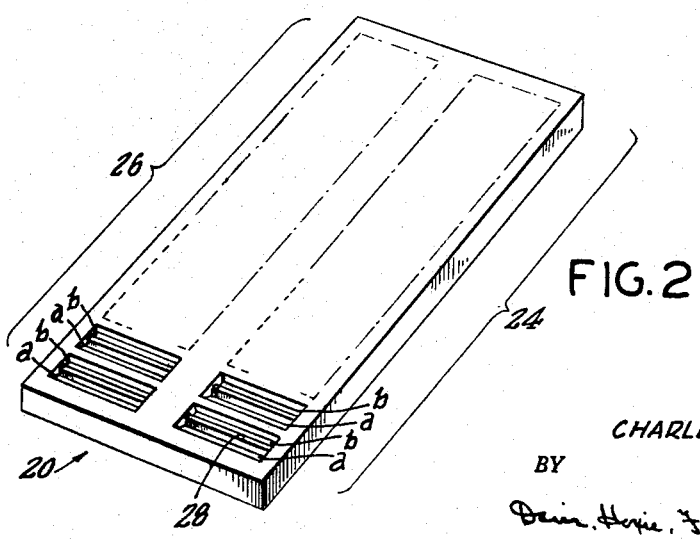
FIG. 2 is a perspective view of a mold such as may be used in the operation of my machine.

The material fed into the machine consists of slabs 16 (FIG. 1a) of wafer material and in this instance the slabs would be composed of a three-ply wafer sandwich with filling. The machine cuts the slabs 16 into individual fingers 18 (FIG. 1b) and deposits them in the mold 20, FIG. 2, which has previously been supplied with coating liquid in a manner that need not be described. The mold conveniently has cavities which are arranged in two rows 24 and 26, suitably spaced, each row being composed of successive pairs of cavities *a* and *b*, each pair being adapted to receive a pair of fingers 4 and 6 making a confection piece. The mold cavities are of a configuration to shape the piece properly as shown in FIG. 1, including the weir 28 fashioned to give a web 14 of suitable thickness. The pieces are made inverted in the mold from the right-side-up position shown in FIG. 1.

It is essential that a finger 18 be deposited in each of the cavities with unvarying precision in its position in the cavity, determinative of the uniformity of coating thickness.

Figure 3:
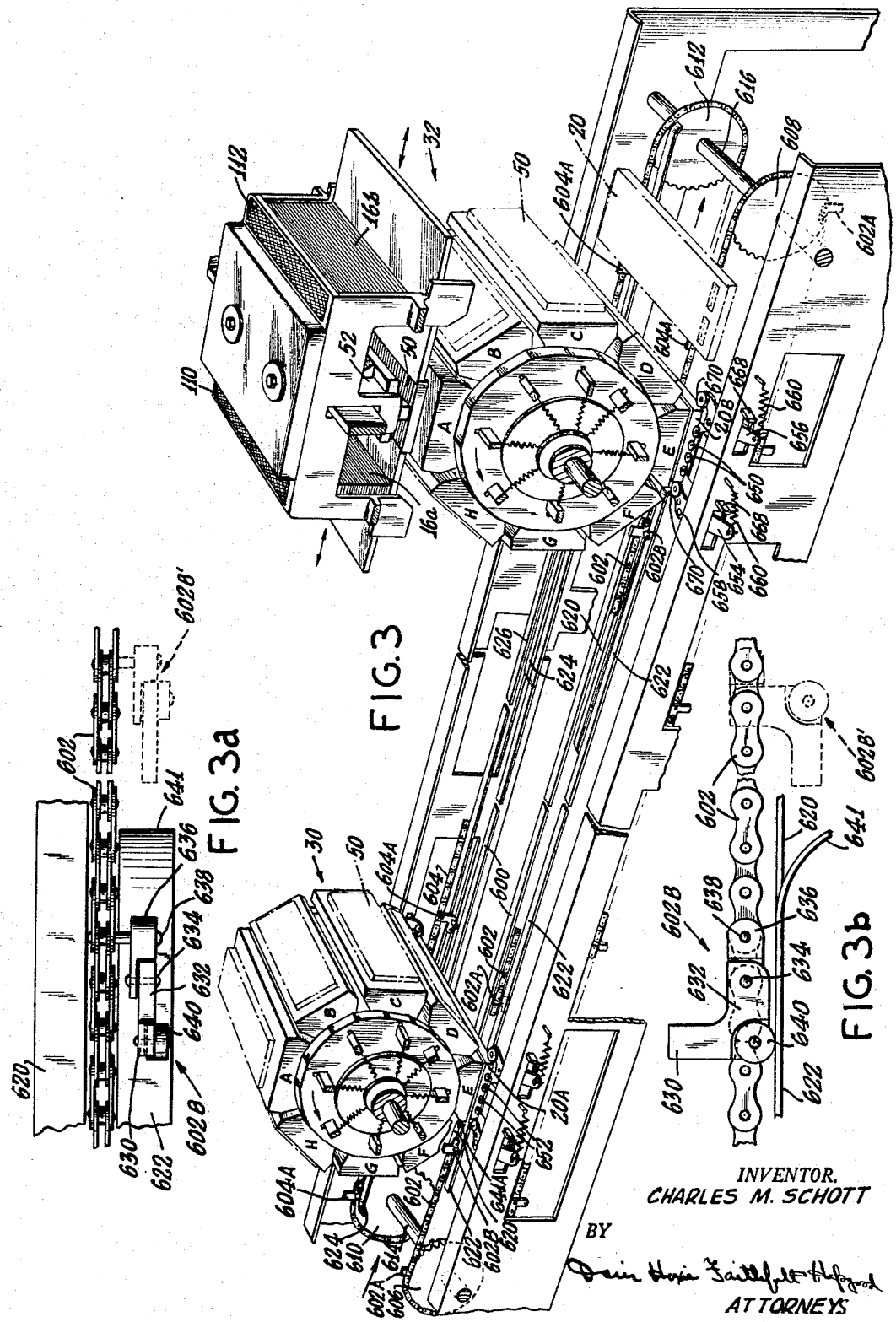
FIG. 3 is a simplified perspective view, with parts omitted, suggesting the general layout of a machine of one type embodying my invention.

Referring to the schematic view, FIG. 3, the apparatus includes a pair of drum units 30 and 32. A series of molds is advanced from unit 30 to unit 32. A series of wafer slabs 16*a* is fed to unit 30 on the left and a series of wafer slabs 16*b* is introduced on the right. The unit 32 is correspondingly supplied with stacks of wafer slabs 16*a* and 16*b*.

As will appear, the drum unit 30 fills all the cavities *a* only (FIG. 2) in each mold and unit 32 fills all of the *b* cavities only. At unit 30, slabs 16*a* fill the *a* cavities in row 26 and slabs 16*b* fill the *a* cavities of row 24. At unit 32, slabs 16*a* supply cavities *b* in row 26, and slabs 16*b* fill cavities *b* in row 24.

The drum units 30, 32 are duplicates, and I shall accordingly confine my description to unit 32.

The drum itself is octagonal having cutter heads A to H, inclusive, on the face of each of which is mounted a series of thin knife blades 50. At 52, aligned over the blades 50 of the head in the uppermost position A, is a platen, which, upon depression, presses into the spaces between the knife blades a wafer slab 16*a* fed in from the left and a wafer slab 16*b* fed in from the right. The pressure of the surface of the platen, which is rubber covered, against the wafer slabs, supported as will be described, severs the slabs into fingers of desired width, determined by the blade spacing. The final cut pinches the wafer between the sharp knife edges and the platen, leaving no kerf and a minimum of crumbs compared to cutting the wafer with a reciprocating saw edge. The knives preferably do not remove material, but displace it laterally so that the severed wafer fingers are compressed between the knife blades and held thereby.

When the knife blades have been filled, the platen retracts upwardly, the drum rotates one-eighth of a revolution, 45°, counterclockwise, and the process is repeated. When the wafer filled knife blades reach their lowermost E position, ejectors in the cutter head eject the cut fingers into the *b* cavities of rows 24 and 26 of the mold 20 at rest in the filling position 20B, the *a* cavities having previously been filled while the mold was at rest at 20A under unit 30.

The details of the construction and operation follow.

2. PLATEN CONSTRUCTION AND RECIPROCATION

Figures 4, 6:
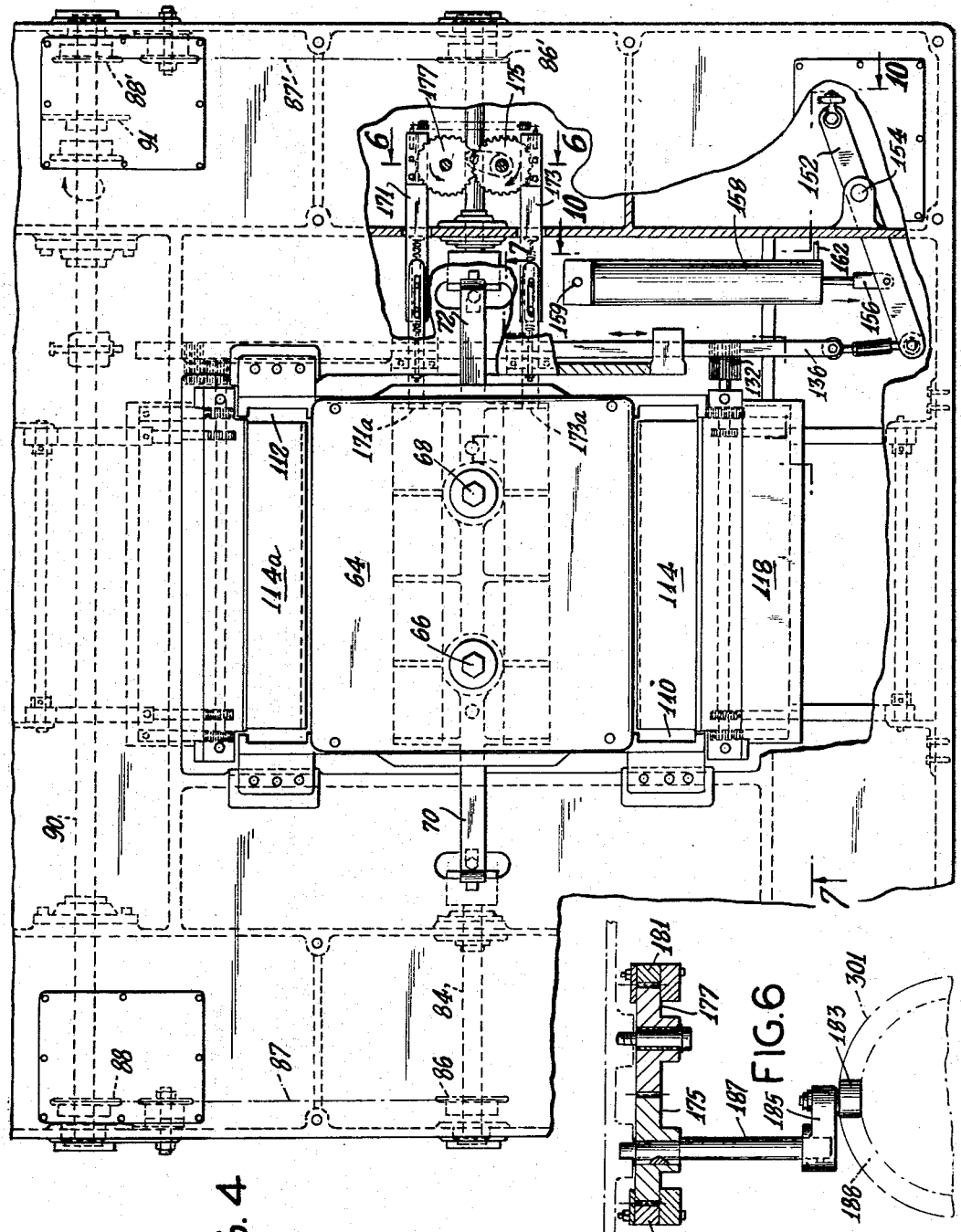
FIG. 4 is a plan view of one of the units of the machine of FIG. 3.
FIG. 6 is a detail vertical section on the line 6—6 of FIG. 4.
Figure 7:
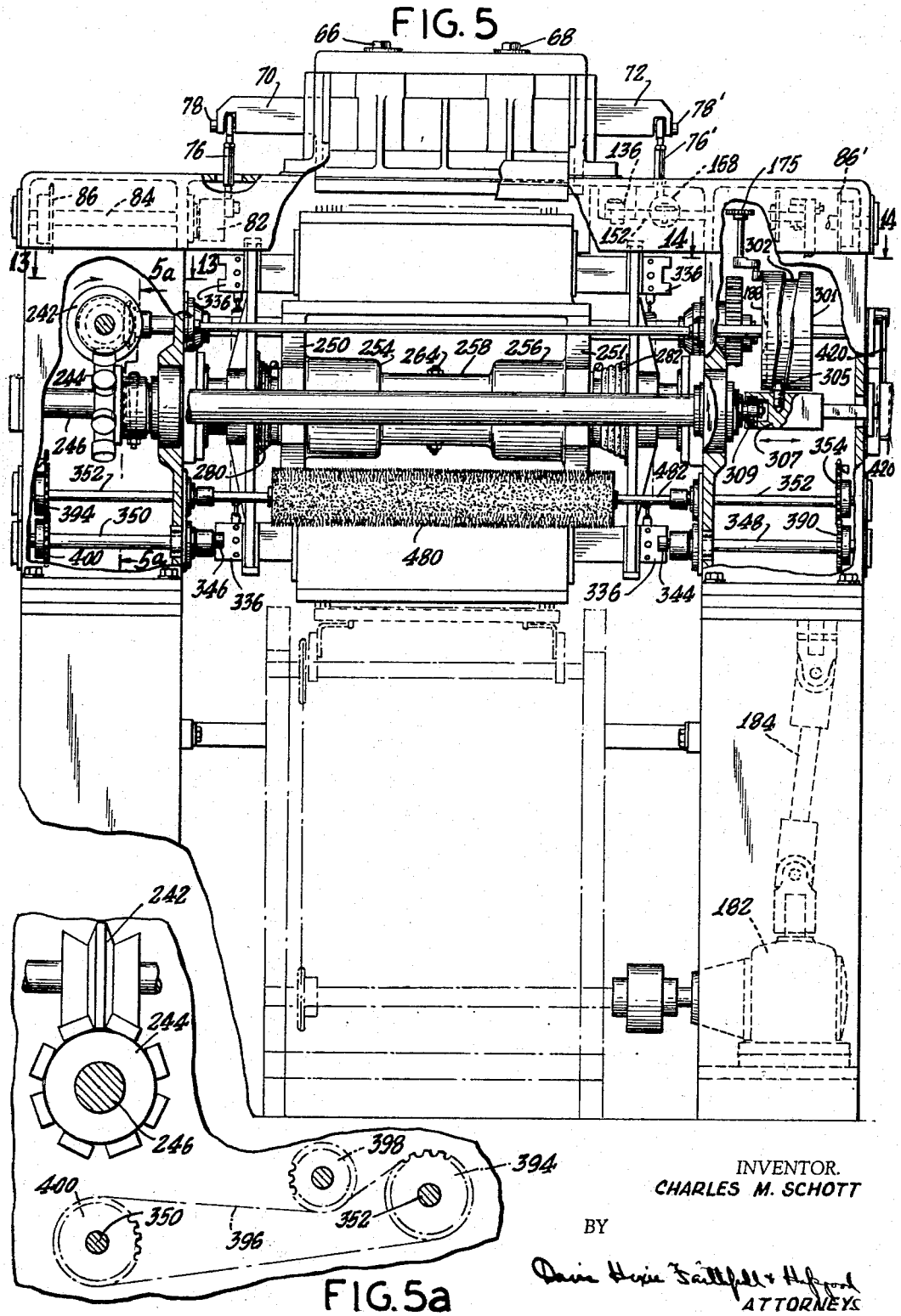
FIG. 7 is an elevation view partly in section on the line 7—7 of FIG. 4, of the upper part of the machine.
Figure 8:
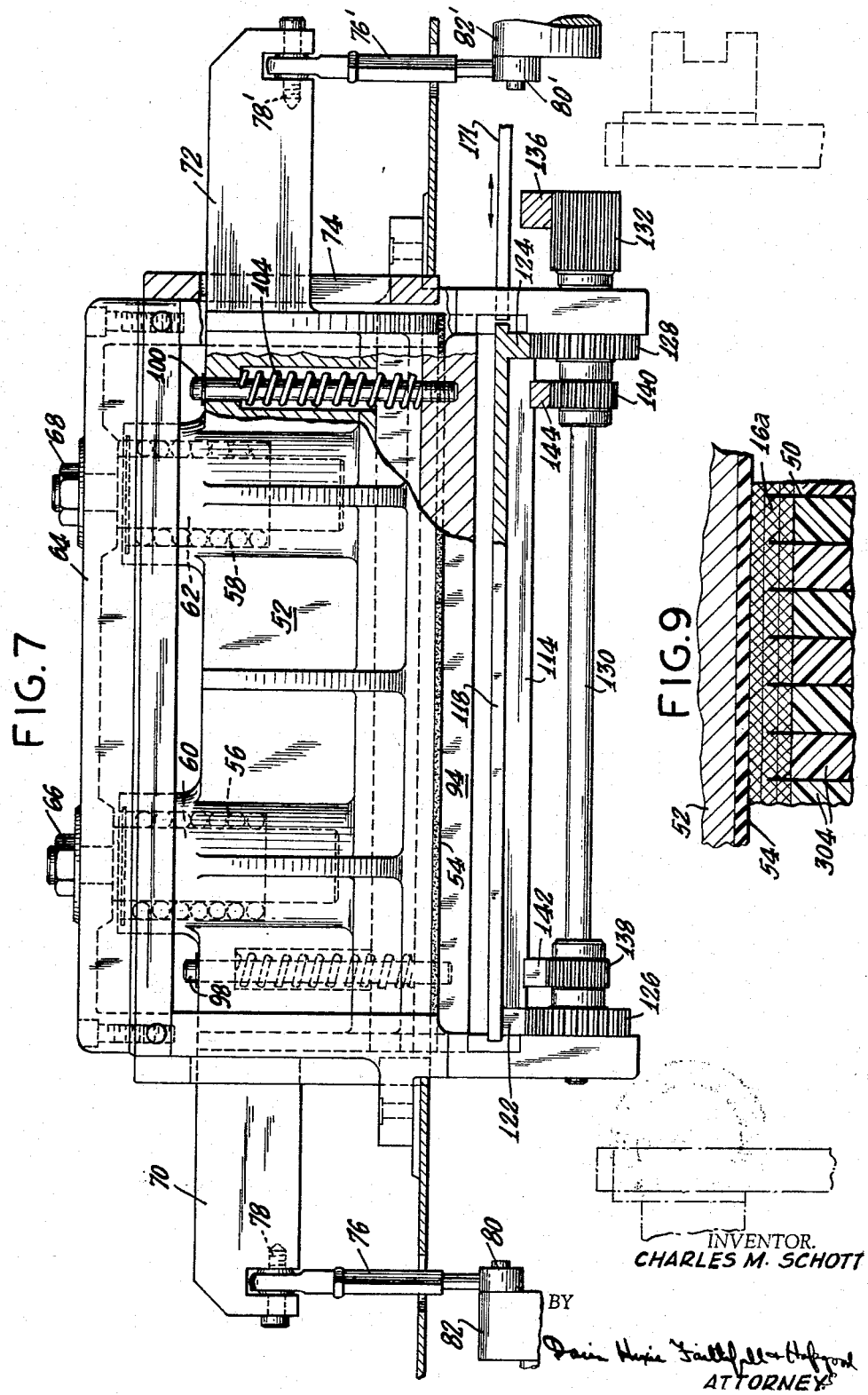
FIG. 8 is an elevation view of the upper part of the machine looking from the right in FIG. 7, showing a platen, to be described, in fully raised position.

Referring particularly to FIGS. 4–8, inclusive, the platen 52, FIG. 8, of a length approximating the span of a series of blades 50 (FIG. 3) and of a width, at its contacting surface 54, approximating the length of a blade (FIG. 8), is mounted for vertical reciprocation by means of a pair of ball bushings 56 and 58 (FIG. 7) in the platen casting which receive pin guides 60 and 62, respectively, depending from the top 64 of the frame. The pins are secured by nuts 66 and 68, respectively, secured over their reduced, screw-threaded ends. Arms 70 and 72, integral with the platen 52, extend outwardly therefrom to the left and right, respectively, as viewed in FIG. 7, through suitable slots in the frame as shown at 74 in FIGS. 7 and 8. Vertical reciprocation is accomplished by connecting rod 76 pivoted at 78 to arm 70, adjustable in length, and pivoted at its lower extremity to pin 80 disposed eccentrically of the hub 82 formed on shaft 84 (FIG. 5). The shaft is driven by sprocket 86 and chain 87 (FIG. 4) from sprocket 88 fixed to drive shaft 90 driven by sprocket 91 as will appear, to rotate periodically. A similar sprocket 88′, chain 87′, sprocket 86′ and associated mechanism comprising a shaft driven by sprocket 86′ and having a hub 82′ carrying a pin 80′ connected by rod 76′ to arm 72 at 78′ to reciprocate the arm 72 on the right side of the machine (FIGS. 4 and 5).

As a stop against which the wafer slabs are positioned as they are fed in above the knives 50 when the platen is in its mid position of FIG. 8*a*, a block 94 is provided, of the width indicated, and extending the full length of the platen, being slidably received in a corresponding recess 96 formed in the platen face. The block is yieldingly supported in the recess 96 by a pair of guide pins 98 and 100 (FIG. 7), which at their lower ends are screwed into the block 94 (FIG. 8*b*) and at their upper ends pass slidingly through apertures 102 in the top of the platen. Each pin is encircled by a compression spring 104 bearing at its top against the upper end of the cavity 106 and at its lower end against the block 94. The block is thus yieldingly pressed downwardly and is kept from falling out of the recess 96 of the platen upon its extreme retraction (FIG. 8) by the collar 108 fixed to the upper extremity of each pin.

At the intermediate position, FIG. 8*a*, of the platen, block 94 rests on the upper surfaces of the blades 50. The spaces between the knife blades, in their areas contacted by the block 94, are occupied by certain spacing blocks, to be described, as the knives do not function for cutting the wafers in those central areas. The wafer slabs 16*a* and 16*b* are fed into position in abutment with the block 94 as shown in FIG. 8*a*, in a manner which will appear, after which the platen descends to cut the slabs into fingers while forcing the fingers into the spaces separating the knife blades as shown in FIG. 8*b*, as will be described in detail. During this operation, the block 94 yields upwardly into the recess 96 as shown in FIG. 8*b*. Platen 52 then lifts to its fully retracted position of FIG. 8, to afford clearance for rotation of the drum.

3. WAFER SLAB FEED

A supply of wafers 16*a* (FIG. 8) is manually stacked in the magazine 110 on the left as viewed in FIG. 8 and there is a corresponding magazine 112 on the right for the wafer slabs 16*b*. The bottom of each of these magazines is in the form of a movable slide 114 suitably guided for reciprocation from its full line position shown at 114 in FIG. 8 to its dotted line position shown at 114′ in that view. The leading end of this slide is recessed at 116 and the inward movement of the slide brings it to rest with the recess 116 overlying the corners 50*a* of the blades so that the upper surface of the lower slide forms a platform, bridging the space between the bottom of the magazine and the top of the knife blades. Subsequent retraction of slide 114 to its full line position affords clearance for the rotation of the drum following the cutting operation. A top slide 118, also suitably guided for reciprocation, and, if desired, resting on the upper surface of the lower slide, has its leading edge 120 retracted out of the magazine and in horizontal alignment with the edge of the lowermost wafer slab 16*a* resting on the lower slide 114. This slide moves to advanced position shown in dot-dash lines, and in doing so pushes the lowermost of the slabs 16*a* over the lower slide, previously advanced, and into the position shown against the stop 94, now in the position of FIG. 8*a*. Simultaneously the same feed operation takes place with a slab 16*b* on the right side.

The upper and lower slides 118 and 114 for the left side of the machine as viewed in FIG. 8 are reciprocated from their full-line positions to their dotted-line positions and returned by a rack and pinion drive which simultaneously reciprocates the corresponding upper and lower slides 118*a* and 114*a* on the right.

Figure 10:
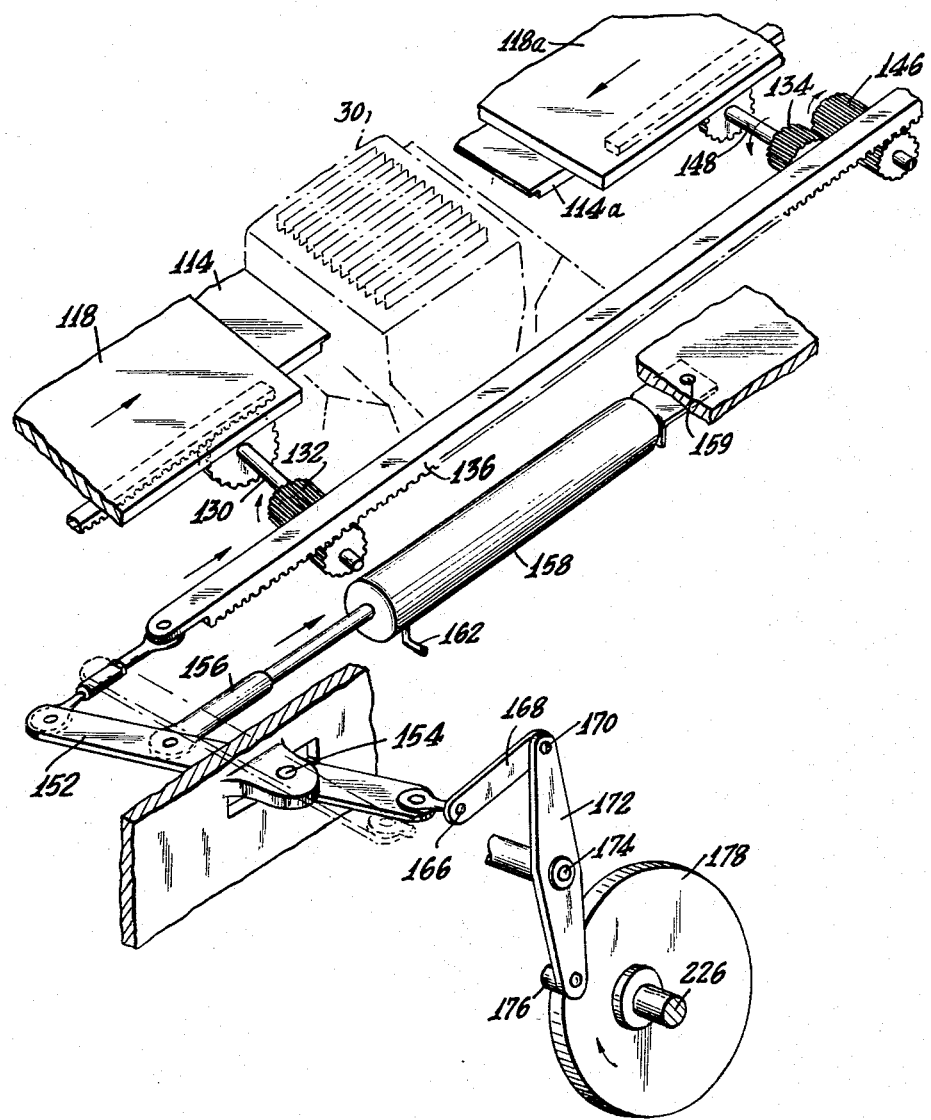
FIG. 10 is a perspective view taken in the general area of the line 10—10 of FIG. 4 showing certain drive mechanisms.

Upper slide 118 (FIG. 7) has integrally secured to its undersurface opposite racks 122, 124, meshing with pinions 126, 128, respectively, secured to shaft 130, journalled in the frame. On an extension of the shaft 130, pinion 132 is mounted which meshes with rack 136 (FIG. 10). The shaft 130 also carries pinions 138, 140, meshing with racks 142, 144, respectively, integral with opposite margins of the lower slide 114. The rack 136 extends across to mesh with the pinion 146 which in turn meshes with gear 134 fixed to the shaft 148. Shaft 148 corresponds to the shaft 130 and carries pinions meshing with racks for operating the upper and lower slides 118a, 114a for the opposite side of the machine. The racks and pinions on the right are not shown in FIG. 10 except for the meshing rack and pinion corresponding to rack 124 and pinion 128, respectively, although the racks and pinions corresponding to racks 124, 144 and pinions 128, 140 are shown in FIG. 8.

Rack 136 (FIGS. 4 and 10) is linked at one end to rocker arm 152 pivoted to a suitable support at 154 and connected by pivoted link 156 to the piston rod of an air cylinder 158 pivotally mounted at 159. On the opposite side of pivot 154, rocker arm 152 extends to a pivoted juncture 166 with link 168, which in turn is pivoted at 170 to the upper end of a cam following arm 172 pivoted at 174 and carrying a cam follower 176, which engages and follows the surface of cam 178, driven as will be hereafter described.

The function of the air cylinder is to advance the slides for wafer slab feed under the cushioning effect of the compressed air particularly in positioning the lower slides with their recesses 116 overlying the corners 50a of the blades. The air supply through line 162 is under the control of valve 157 (FIG. 16) operated by cam 160 as will be described.

The slides are retracted by the cam 178 (FIG. 10).

Upon admission of air to cylinder 158, rod 156 is moved inwardly, as shown by the arrow, causing rocker arm 152 to rotate clockwise, and move rack 136 to the right, as viewed in FIG. 10. This rotates pinion 132 clockwise, rotating shaft 130 clockwise at the same time that shaft 148 on the opposite side of the machine is rotated counterclockwise, thus moving the slides inwardly from both sides. The upper slide moves faster and through a greater distance than the lower slide on each side, and to that end the pinions 126, 128 (FIG. 7) for driving the upper slide 118, are appropriately larger in diameter than the pinions 138, 140, also on shaft 130, for advancing the lower slide 114, and similarly for the slides on the opposite side.

After the upper and lower slides have been moved pneumatically to their inward positions for delivery of a wafer slab onto the knife blades against the stop 94, as shown for the slabs 16a and 16b in FIG. 8a, the deposited slabs are adjusted in position, if necessary, by adjusting fingers which now move in against an end of each slab. These fingers, as shown at 171 and 173 in FIG. 4, are mounted for longitudinal sliding movement through suitable guide slots in the frame, and their inner extremities 171a and 173a, at the innermost limit of their travel, as shown in that view, assure that the slabs are properly positioned in the direction of their lengths. The advancing and retracting motion of the fingers 171 and 173 is accomplished by a pair of meshing pinions 175 and 177, which in turn mesh with racks 179 and 181 (FIG. 6), respectively, on the fingers. Oscillation of the pinions 175 and 177 is accomplished by cam follower 183 carried by arm 185 fixed to shaft 187 carrying the pinion 175 and bearing against the cam surface 188, which advances as will be described. The fingers 171 and 173 retract from their advanced positions prior to depression of the platen 52.

4. THE ROTARY CUTTER DRUM

The drum 32, as stated, is mounted for intermittent rotation in steps of 45° to bring its successive eight cutter heads A–H (FIGS. 3 and 11) into stationary position beneath the platen 52 at the same time that the diametrically opposite head is moved to stationary position immediately above a mold to be filled.

Figure 11:
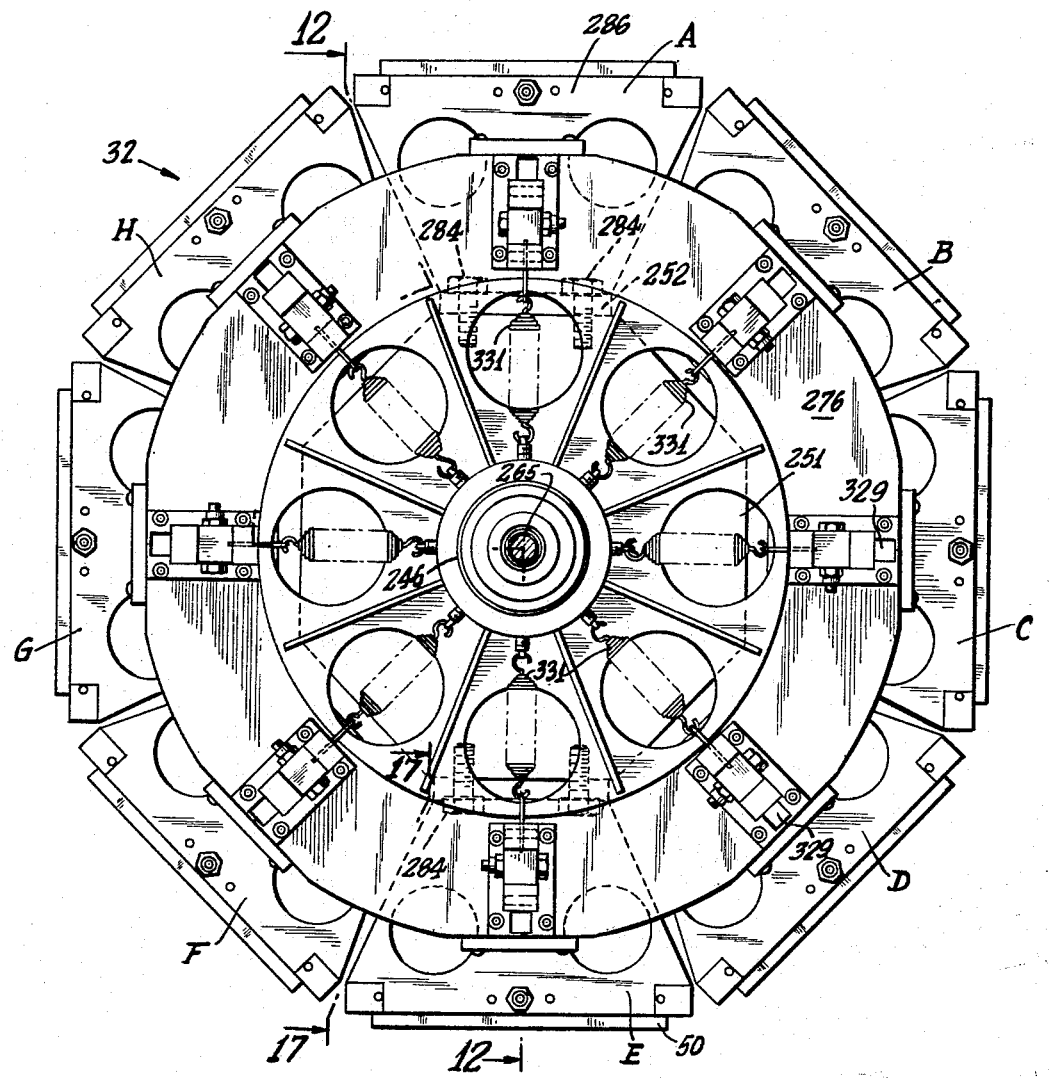
FIG. 11 is an end elevation view of a rotary drum mechanism disposed immediately beneath the platen mechanism shown in FIG. 8, as FIG. 8 indicates.

The drum is constructed as shown in FIGS. 11 and 12 and has a hub composed of enlarged hub portions 254 and 256 connected by a reduced hub portion 258. Integral with the opposite extremities of the enlarged hub portions 254 and 256 are the opposite drum ends 250 and 251 octagonal in elevation to support the eight cutter heads A–H inclusive.

The drum is mounted on shaft 246 (FIG. 12) to rotate therewith and also, for a purpose which will appear, to move longitudinally thereof from the full-line position of FIG. 12 to the position suggested by dot-dash lines. To that end, the drum is supported by bearings on the shaft 246 as shown at 260 and 262, accommodated by the enlarged hub portions 254 and 256, respectively, of the drum. Pin 264 passes through opposite aligned holes 266 and 268 formed in the reduced hub 258 and through opposite elongated slots 270 and 272 formed in the drive shaft 246 for freedom of movement of the pin 264 and hence of the drum 32 longitudinally of the shaft 246. The pin 264 passes through a spindle 263 slidably mounted coaxially of the shaft 246 and moved longitudinally as will appear. The pin is secured in position by nuts as shown. Pin 264 allows the drum to move axially while still being retained on shaft 246. As will be explained below, the axial movement of the drum is to facilitate the location of the ejector pads 304 behind the appropriate portion of the wafer sought to be ejected.

Keyed to the shaft 246 to rotate therewith are the collars 265 and 267 (FIGS. 11 and 12) which form hubs for the circular end plates 274 and 276. The framing, of which the plates 274 and 276 are parts, rotates with the drum but does not move lengthwise of the shaft 246. The drum, on the other hand, rotates with shaft 246 and also moves longitudinally thereof, as described. Thus there is movement of the drum relative to the end plates 274 and 276 in a direction lengthwise of the shaft 246. To accommodate such relative motion, while shielding the parts, yieldable bellows 280 and 282 are used as shown. Bellows 280 is shown in its extreme contracted position and bellows 282 in its extreme expanded position under the circumstances that the drum, in FIG. 12, is in its extreme left-hand position.

Figure 17:
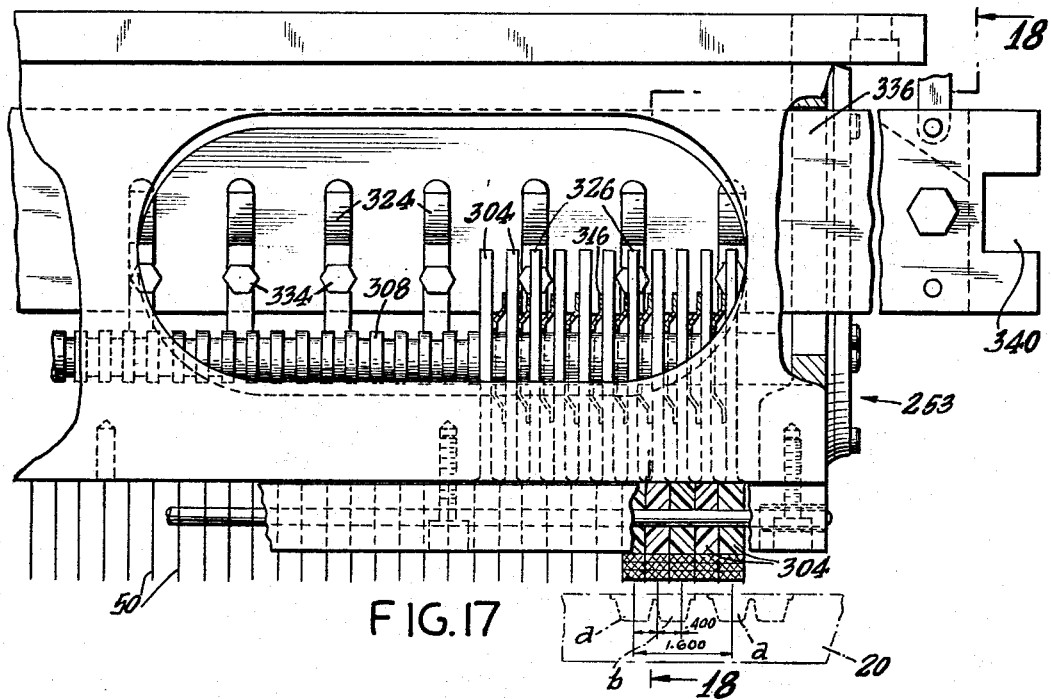
FIG. 17 is an enlarged elevation view, partly in section, on the line 17—17 of FIG. 11.
Figure 18:
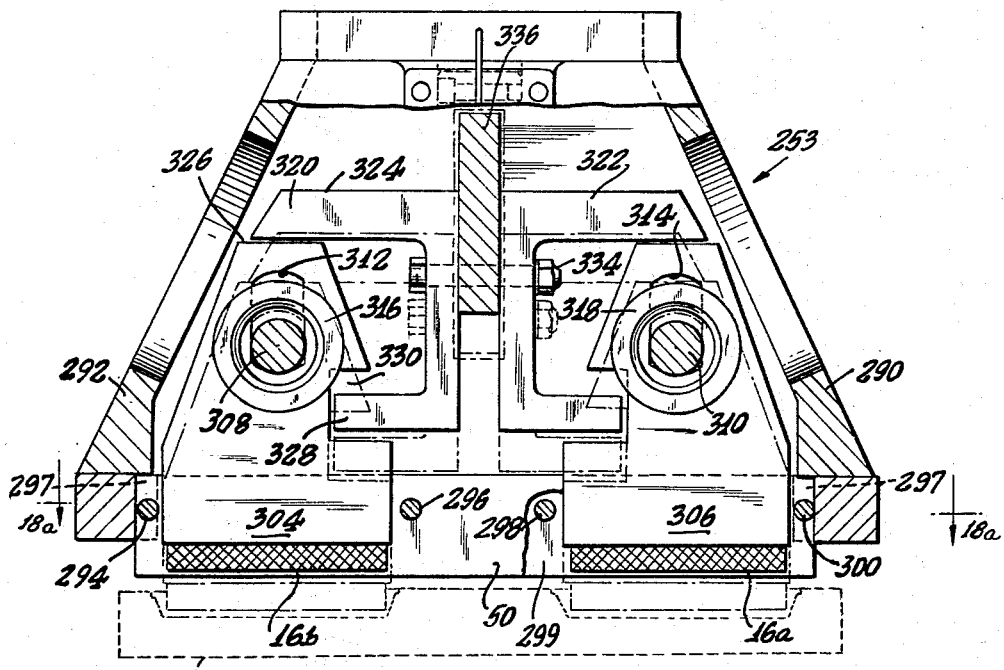
FIG. 18 is a vertical section, partly in elevation, on the line 18—18 of FIG. 17.

Each of the eight cutter heads A–H of which one is shown at 253 in FIGS. 17 and 18, has a housing composed of end walls 286 and 288 (FIG. 12) and converging side walls 290, 292 (FIG. 18) joining the end walls. The outer faces of the cutter heads support the knife blades, as will be described, and their inner faces 252, to which the side walls converge, are bolted at 284 (FIGS. 11 and 12) to the octagonal drum ends 250 and 251.

Each of the blades 50, extending nearly the full width (FIG. 18) of the outer face of the cutter head, is supported on four rods 294, 296, 298, and 300 extending axially of the drum through the full length, axially, of each head. The blades supported on the rods, are equidistantly spaced apart by suitable spacing means or blocks, 297, 299, also receiving the rods (FIG. 18a).

To perform the dual function of yieldingly supporting the wafer slab, between blades, during the cut and of ejecting the cut wafer fingers from between the blades for deposit in the mold following the cut and following a certain transfer operation to be described, each cutter head is provided with two series of what I shall term ejector pads, a pad of one series being shown at 304 in FIGS. 17 and 18 and a pad of the other series being designated 306. These pads are of a thickness to slide freely in the spaces separating successive blades. Their vertical reciprocation is indicated in dot-dash lines.

The pads are also guided by rods 308 and 310 passing through elongated slots 312 and 314 in the left and right series of pads (FIG. 18), respectively. As a means of frictionally resisting the sliding movement, disc springs 316, 318 are provided which, as shown in FIG. 17, are concave-convex to press laterally against adjacent pads. They are held from following the pads in their vertical movement by the aforesaid rods 308, 310 passing through corresponding apertures in the discs.

Vertical movement of the pads is effected by the U-shaped ejector dogs 320 and 322 (FIG. 18). The dogs are similar in construction, and the dog 320 has an upper arm 324 in vertical alignment with and adapted to abut the upper surface 326 of the ejector pad 304, for lowering the pad, and a lower arm 328 received by a slot 330 formed in the pad and adapted to engage the upper surface of the slot for raising the pad. The purpose of elongation of the slot 330 is for relative lost motion between arm 328 and the pad when the dog is power retracted. To assure ejection of the cut pieces, the pads are advanced downwardly to protrude outwardly of the knife edges a fraction of an inch and are then retracted to position flush with knife edges at the end of the upward stroke of the dog as the arm 328 hits the upper limit of the elongated slot 330. The pad then stays in its flush position until it is fully retracted under the pressure of the wafer as the wafer is pushed into the knives by the platen. Thus the wafer is yieldingly supported during the cut, which I have found enhances the cutting operation. The support is afforded by the friction of the spring discs 316, 318.

The ejector dog 322 functions in a similar way, and the two dogs are bolted together, for simultaneous actuation, by nut and bolt 334, securing them to an ejector bar 336. Raising and lowering of the ejector bar 336 will raise and lower dogs 320 and 322, which in turn will raise and lower those pads 304 and 306 of the two series with which the dogs are in vertical alignment.

It is to be noted from FIG. 17 that the successive dogs in each series, in this instance the dogs 324, are spaced from each other by intervals greater than the intervals at which the successive pads of each series, in this instance the pads 304, are spaced, and that the dog spacing interval is a multiple of the pad spacing interval. In the embodiment shown, the dogs in a given series actuate, at one time, every fourth pad in the corresponding series, after which the drum is indexed longitudinally of its axis and the dogs are again operated to actuate the next four pads in the series. That is, following actuation of, say, pads 1, 5, 9, etc., of the series, the drum is indexed or moved longitudinally of its axis a distance equal to the width of one pad, and the ejector dogs are then again operated to actuate pads 2, 6, 10, etc., of the series. During the axial indexing movement of the drum, the ejector bar 336 and the dogs 320 and 322 secured to it remain stationary while the drum and ejector pads move longitudinally, thus bringing the dogs into vertical alignment with the successive sets of every fourth pad of the series. This is repeated four times, in cooperation with a certain mold feed to be described, when the particular cutter will be empty.

To operate the dogs 320, 322 is the function of the bar 336 to which they are secured. The bar extends axially of the drum and outwardly of the end walls 286 and 288 (FIG. 12) of the cutter head and through elongated slots 329 in both of the end plates 274 and 276. Each ejector bar 326 is yieldingly held in retracted position by springs 331 and 332 at opposite ends, connected at one end to the bar and at their opposite ends to the hubs 267 and 265, respectively, on the rotary shaft 246.

Movement to eject against the action of the springs 330 and 331 is effected as follows: At its opposite extremities each of the bars 336 is slotted, as shown at 340 and 342. When the knives of the head under consideration reach their lowermost discharge position for ejection of the cut fingers to the mold, these slots receive rollers 344 and 346 (FIG. 5), respectively, which are eccentrically mounted with reference to shafts 348 and 350, respectively, which, at the right time, are power rotated to cause the ejection.

5. THE DRIVING MECHANISM

The principal drives are shown in FIGS. 13–15 inclusive.

The main drive shaft 180 (FIG. 15) derives its power from a source 182 (FIG. 5) through the universal linkage 184 and carries a bevel gear 186 meshing with a bevel gear 186a fixed to shaft 190 carrying secured to it the gear 192. The latter drives gear 194 fixed to shaft 196 to which is also secured gear 198, meshing, in turn, with gears 200 and 204 on shafts 202 and 206., respectively. The drives are in the directions indicated by arrows, and gears 200 and 204 both rotate clockwise.

Gear 204 furnishes the power for actuating the platen 52. It rotates continuously and is connected through a clutch 203 with shaft 206 carrying sprocket 550 around which the chain 552, tensioned by idler 89, passes, as shown in FIG. 15. This chain drives sprocket 91 and thereby shaft 90, which, as described with reference to FIGS. 4 and 5, supplies power to actuate the platen. The sprocket 550 is held from rotation by detent 201 engaging one of two teeth 199 and 197 of the wheel 195 urged to rotate clockwise through the clutch 203 and fixed to shaft 206. Detent 201 is momentarily raised to release wheel 195 for lowering platen 52 from its retracted position of FIG. 8 to its mid-position of FIG. 8a by link 193 connecting the pivoted bell crank 191, of which the detent 201 forms one arm, to the crank lever 189 pivoted at 189a and yieldingly urged counterclockwise by spring 185a to press cam follower 189b against cam 181a on shaft 210 and having lobe 179a. The cam 181a is driven as will appear, and functions to release the detent 201 momentarily by rotating the pivoted elements clockwise. Shaft 206 stops when tooth 197 is engaged by detent 201. This 90° rotation of shaft 206 lowers platen 52 from its FIG. 8 to its FIG. 8a position bringing block 94 into position to act as a stop in the path of travel of incoming slabs 16a and 16b. Further depression of the platen to the cutting position of FIG. 8b occurs upon the next actuation of detent 201 releasing tooth 197 upon the succeeding rotation of cam 181a. The subsequent raising of the platen is accomplished by the further rotation of the eccentrics 82 and 82' (FIGS. 5 and 7). Tooth 199 engages detent 201 when the platen is fully raised, and the platen drive mechanism then stops.

The cam 181a is driven from shaft 210, to which it is fixed. The shaft is driven by a gear 208 fixed to the shaft 210 and meshing with gear 204 fixed to shaft 202 carrying gear 200 power driven as aforesaid and connected to shaft 202 through a clutch, as will be described.

Also secured to shaft 210 is a pinion 212 meshing with gear 214 which drives shaft 216. The gear 214 drives pinion 218 fixed to shaft 222 on which gear 220 is also fixed. The gear 220 meshes with pinion 224 on shaft 226.

The cam 178, which, as above described (FIG. 10), functions to retract the wafer support and feed slides 114, 118, 114a, and 118a (FIG. 8), is fixed to shaft 226 (FIG. 14) which is driven from the gear 224 through a single revolution clutch 169, of common construction, released upon disengagement of detent 165 from tooth 165a of the clutch wheel. For such release, detent 165 is raised by a trip consisting of the arm 163 fixed to shaft 131 to which pawl 165 is fixed, notched at its extremity to receive a pin 161 on the end of arm 164 pivoted at 167 and forming a bell crank with another arm 155 which protrudes into the path of a camming roller 153 carried by gear 214. The arrangement is such that when roller 153 raises arm 155 and depresses arm 164 and arm 163, detent 165 is retracted for rotation of cam 178. The clutch 169, as stated, is a one-revolution clutch as detent 165, by means of a tension spring (not shown), returns to engaging position soon after shaft 226 begins to rotate, when arm 155 will be released by camming roller 153.

6. DRUM INDEXING

The cutter drum is actuated in two ways, as indicated, first, by periodic rotation through steps of 45° and, second, by a stepwise indexing movement longitudinally of its supporting shaft 246, as indicated by dot-dash lines in FIG. 12.

Considering first the periodic rotational movement, the drive comes from the shaft 196 (FIG. 15) which extends across the machine from the right to the left gear box (FIG. 13) and drives bevel gear 236, which in turn drives bevel gear 234, thereby driving shaft 232 on which it is mounted. The hub 237 of gear 234 enters a single revolution clutch 238, which, when actuated as will be described, rotates shaft 240, leading from the clutch, one revolution. Worm 242 is mounted on and driven by shaft 240 and it meshes with worm wheel 244 (FIG. 5) which is fixed to the aforesaid shaft 246 on which the drum is mounted and by which it is rotated.

The single revolution clutch 238, of usual construction, is released by a trip 149, for a single revolution of the shaft 240, by rotation of shaft 147, on which the trip is secured. The shaft 147 carries a crank 145 connected by a link 143 (FIG. 13a) to crank 141 fixed to shaft 139, which extends across the machine and enters the right-side gear box as shown in FIG. 14. The shaft 139 carries crank 137 (FIG. 15) connected by link 135 to arm 133 of a bell crank rotatably mounted on the pivot 131. The other arm 129 of the bell crank carries a follower 127 (FIG. 14) engaging cam 125 having a lobe 123 (FIG. 15) which actuates the bell crank to rotate shafts 139 and 147 for release of the clutch 238.

The indexing motion of the drum lengthwise of the shaft 246 is accomplished by a cam 301 (FIG. 14). This cam is fixed to shaft 216, driven as described, and has a cam slot 302. A follower 305 (FIG. 5) entering the slot is carried by a slide 307, suitably supported, and which has a thrust bearing 309 which receives the end of the longitudinally movable spindle 263. In this manner rotation of cam 301 effects lengthwise indexing of the drum and the cam groove 302 has a series of small steps for indexing the drum to the right (FIG. 12), there being four steps in the embodiment described, followed by a larger step to return the drum to its initial full-line position.

At one side of the said cam 301 is the aforesaid cam surface 188 (FIGS. 5 and 6) for actuating the positioning fingers 171 and 173 (FIG. 4).

The drive for the ejector bar operating eccentrics 344, 346 (FIG. 5) comes from the gear 192 (FIG. 15, lower right) which drives gear 351 on shaft 352 to which sprocket 354 is also secured. Chain 356 trained around the sprocket and an idler 392 is thereby driven. This drive is through a further one-revolution clutch 358 having a detent on the arm 360 which is pivoted at 366 and drawn clockwise into restraining position by spring 368. Arm 370, fixed to pivot 366 to move with arm 360, carries a cam follower 380 bearing against a cam mounted on shaft 202 having a lobe (not shown) which effects withdrawal of the detent from the clutch. Chain 356 is then driven, rotating sprocket 390, about which it is also trained, thereby driving shaft 348 to which the sprocket is secured. To the axis of this shaft, whereon it is secured for rotation, the actuating roller 344 (FIG. 5) extends eccentrically.

There is a similar drive on the opposite side of the machine, and to that end drive shaft 352 extends across the machine (FIG. 5) and also carries a sprocket 394 (FIG. 5a) which, by chain 396, tensioned by idler 398, drives sprocket 400 on shaft 350 to which the actuating roller 346 (FIG. 5) is eccentric.

I have found it desirable to brush the knives 50 free of any wafer particles following the deposit in the mold and for that purpose I provide a rotating brush 480 (FIG. 5) carried on shaft 482, which (FIG. 15) is driven by sprocket 484 having chain 486 trained around sprocket 488 driven by shaft 226. The brush bears against the empty knife blades.

7. CONTROLS

There are two controls for starting and stopping the machine, one of which is manual. The other is automatic depending upon whether a mold is approaching filling position. Both controls cooperate to effect the position of the detent 424 (FIG. 15) either in latching position, as shown, or raised about the pivot 422 on which it may rotate freely. The gear 200 rotates continuously from the drive as long as the power is on, but the connection through clutch 423 to shaft 202 to gear 204 is ineffective so long as detent 424 is in engagement as shown. Lifting of the detent 424 out of engagement is accomplished by a pin 437, which projects inwardly from FIG. 15 to a position beneath the detent. Pin 437 also connects link 435, freely mounted on pin 422, with the upper end of link 438, the lower end of which is pivoted at 439 to the upper end of link 436. Link 436 leads downwardly and is pivoted to arm 440 fixed to shaft 442 to which arm 444 is fixed. Arm 444 is connected by link 446 to bell crank 448 pivoted at 450 and carrying a roller 452 protruding into the path of the oncoming mold 20. The roller 452 will ride on the top edge of a mold passing beneath and will fall when a mold has passed. When the roller is elevated, the bell crank rotates clockwise to rotate crank arms 444 and 440 counterclockwise which will move link 436 upwardly. If links 436 and 438 are in alignment with each other at their pivot connection 439, the raising of link 436 will lift pin 437, thereby raising detent 424 from engagement with tooth 426. The aligned position of links 436 and 438 is under the control of a starting lever 420, manually operated, fixed to shaft 422 to which is splined crank 432 joined at 443 to link 434 which is pivoted at 441 to the aforesaid link 436. The parts are shown with the starting lever 420 in its "on" position, thereby aligning links 436 and 438 for elevation of the detent 424 upon approach of the mold as described. If starting lever 420 is rotated counterclockwise, crank 432 will also be rotated counterclockwise, breaking articulated links 436 and 438 from their aligned position for release of the detent to stop the machine when tooth 426 rotates into the locking position shown. The machine thus always stops in the same position and the starting lever is an overriding control as the machine cannot start, regardless of the approach of a mold, until the articulated linkage is aligned manually when the machine is ready for deposit.

8. MOLD FEED

In FIG. 3, the two drum mechanisms 30 and 32, each has its mold filling position, beneath its head E, as indicated at 20A for the mechanism 30 and at 20B for the mechanism 32.

Any suitable feed mechanism may be employed for moving the molds successively into and out of these filling positions and from one drum mechanism to the other. Supporting tracks 600 run the length of the machine and are suitably spaced apart for adequate support of the molds, which slide on the tracks in advancing through the machine.

As drive means for advancing the molds, while permitting them to stop in filling positions beneath the two drum mechanisms, I have shown two drive chains 602 and 604, the chain 602 being trained about opposite sprockets 606 and 608 and the chain 604 being trained about opposite sprockets 610 and 612. The sprockets 606 and 610 are mounted on a common shaft 614, and the sprockets 608, 612 are mounted on a common shaft 616 one of which shafts is driven to advance both chains continuously at a constant rate of speed, the same for both chains.

Each of the chains has two series of dogs, one mounted on the inside of the chain as the machine is viewed from above, and the other on the outside. The dogs of the inner and outer series for chain 602 are designated 602A and 602B, respectively, and, for chain 604, 604A and 604B, respectively.

Each of these dogs is rotatably mounted on the chain and adapted to be moved, by certain guide rails, into feed position, and alternatively to be released to inactive position, to accomplish the periodic feed of the molds while the feed chains are continuously moving. The rails for the inner and outer series of dogs on the chain 602 are designated 620 and 622, respectively, and the rails for the inner and outer dogs carried by chain 604 are shown respectively at 624 and 626. In FIGS. 3a and 3b. I have shown a section of chain 602 with inner and outer guide rails 620 and 622. A feed dog of the outer series for the chain 602 is shown at 602B and, typical of all of the feed dogs, is composed of a right-angled piece of stock presenting the lug 630 upstanding from the base 632. The dog is secured to the chain by pivot pin 634 protruding from a bracket 636 secured to an extension of a pin 638 of the chain. At 640, the dog carries a roller adapted to support the weight of the dog and the thrust against the mold by bearing on the outer rail 622. The rail is discontinuous, as indicated by the turned-down end 641. When the dog, moving in the direction indicated by the arrow, reaches the rail end 641, its roller 640 is no longer supported so that the dog, by its own weight, rotates about pivot 634 from its full-line position to the position shown in dot-dash lines at 602B', the purpose of such rotation being to remove the lug 630 of the dog from its feeding position shown in full lines, adapted to engage and advance a mold to its retracted position, where the lug 630 is out of feeding position and may pass beneath a mold without advancing it.

The inner dogs 602A of chain 602 are similarly constructed and have corresponding rollers supported by rail 620 also interrupted for retraction of the inner dogs to inactive position. For the chain 604, the inner and outer dogs are similarly constructed and rail operated.

Corresponding dogs of the inner series for both chains are in alignment laterally of the machine, and corresponding dogs in the outer series for both chains are also laterally aligned, and in this way when a mold is advanced, it is engaged simultaneously by two dogs, one from each chain, either pair of outer dogs or a pair of inner dogs.

The molds, delivered for filling, are precisely adjusted and held in predetermined filling positions 20A and 20B. For that purpose, each filling station is provided with side rollers adapted to engage opposite ends of the mold, of which the set of rollers for one end of the mold at the 20B position is shown at 650 and one set for the 20A position is shown at 652, it being understood that there is a corresponding set of rollers, not shown, on the opposite side of the machine. For precision I have shown, for the position 20B, a pair of positioning arms 654 and 656, each pivotally mounted to the frame at 658, spring rotated in a counterclockwise direction by spring means 660 positioning the arms yielding against fixed stops 668 and with rollers 670 on their inner extremities adapted to engage the two sides of the mold and hold it accurately in filling position. The same mechanism is duplicated on the oposite side of the machine from that shown and also for the 20A position.

9. GENERAL OPERATION

In operation, a mold is introduced to the machine from the left, as viewed in FIG. 3, in any suitable way, and is picked up by the pair of inner feed dogs 602A and 604A shown at the entrance end of FIG. 3, the dogs having been raised to feed position by engagement with the inner rails 620 and 624. As the inner dogs reach feed position 20A, their supporting rails are interrupted, as typified by the turned-down end 641A of rail 620. In that way, the mold is delivered to the positioning arms at the 20A station. After the elapse of the needed dwell time, a pair of outer dogs 602B and 604B, rotated into upright feeding position as they approach filling station 20A by engagement of their rollers with outer rails 622, 626, engage the mold, now filled, and move it to position 20B, where the feed dogs drop into inactive position after delivering the mold into the influence of the gripping arms 654 and 656. After the elapse of the same desired dwell time, the next succeeding pair of inner lugs following that pair which brought the mold to the 20A position, rises into feed position by engagement with the inner rails 620, 624 to engage the mold and remove it from position 20B out of the machine.

In the operation of each of the drum units of the machine, the magazines 110 and 112 (FIG. 8) are first filled with slabs 16a (FIG. 1a) and the starting handle 420 is moved clockwise so that the articulated links 436 and 438 are aligned, which will start the machine if a mold is sensed by roller 452. The platen 52 (FIG. 8) position of FIG. 8a as the result of momentary release of the latch 201 (FIG. 15), permitting 90° rotation of shaft 206. The bridging slides 114, 114a (FIG. 10), and the in-feeding slides 118 and 118a are then operated as the result of admission of air to cylinder 158 through the operation of the valve in supply cylinder 157 (FIG. 16), thereby delivering an individual wafer from each magazine onto the top of the blades 50 (FIG. 8) of the head A of the drum in uppermost position (FIG. 12) and against the stop 94 (FIG. 8a). The wafer slabs thus in-fed are adjusted in position, if need be, by the fingers 171 and 173 (FIG. 4), which now move inwardly and then retract. The slides 118, 118a, 114, 114a (FIG. 10) also now retract. Platen 52 then descends fully to its FIG. 8b position, through release of the detent 201 (FIG. 15) from tooth 197, thereby pressing the wafers 16a, 16b downwardly against the blade edges, the positioning block 94 (FIG. 8a) yielding upwardly into its recess 96 during this operation.

Figure 9:
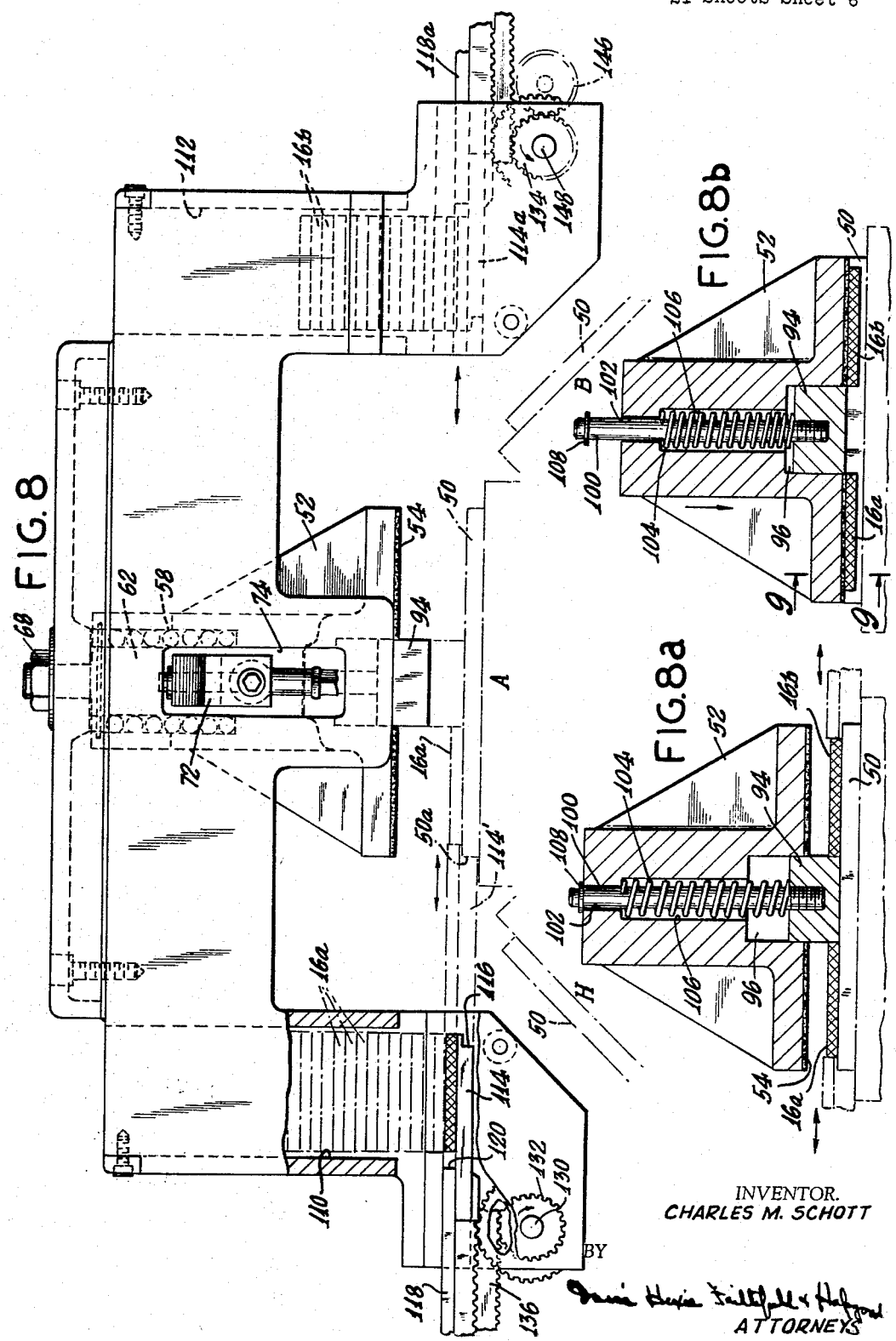
FIG. 9 is a vertical section, partly diagrammatic, showing the cutting operation.

The wafer slabs 16a and 16b are subjected to a cushioned yielding pressure from both sides during this cutting operation as they are supported from beneath by the pads 304 (FIG. 9), yieldingly restrained by spring discs 316 (FIG. 18) while being pressed downwardly from above by the rubber layer 54 (FIG. 9) on the bottom contacting surface of the platen. FIG. 9 shows this cutting operation partially complete, the thin, sharp knife blades being forced upwardly into the soft, paste-filled wafer sandwich thus cushioned on both surfaces. Completion of the cut is accomplished as the knife edges nip the pastry against the rubber layer 54, and the cut is completed without kerf or crumbling as the knife edges sink into the rubber.

The platen then retracts to its fully raised position of FIG. 8 upon release of the detent 201 (FIG. 15) from tooth 197, and when it is fully elevated, the drum rotates 45 degrees to bring its head A (FIG. 11) into the position shown for the head H. This rotation is accomplished by a single revolution of the worm 242 (FIGS. 5 and 13) actuated by the drives above described. The purpose of this periodic rotation is to present successive empty heads to filling position A uppermost as shown in FIG. 11 while presenting successive filled heads to the lowermost position of the cutter head E, thereby transporting the cut water fingers from cutting position to filling position. During this step-wise rotation of the drum, the cut wafer fingers are held wedged between the knife blades in the position in which they were forced during the cutting operation. The cutter head with its thin blades thus affords not only an ideal cutting mechanism but a highly effective feed or transporting mechanism as well.

While the head A was in its uppermost position as shown in FIG. 11, the head E in the lowermost position, which had been filled during a previous filling operation, is subjected to the operation needed to discharge the cut wafer fingers held between its knife blades. The discharge is accomplished by downward movement of the ejector pads 304, 306 (FIGS. 17 and 18) upon actuation of the bars 336 accomplished (FIG. 5) by rotation of the shafts 348 and 350 carrying the eccentrics 346 and 344 working in the slots 340 and 342. My invention provides a machine having these desirable operating characteristics while at the same time accommodating molds having cavity spacings substantially different from the spacings of the cut wafer fingers, and it is to afford such accommodation that the axial drum indexing is provided. That is, the centers of adjacent cavities of a mold are separated more widely than the center lines of adjacent wafer fingers contiguous to successive knife blades. This is due to the necessary thickness of the mold cavity walls in contrast with the desired thinness of the knife blades.

Referring to FIG. 17, I have shown the mold 20 in position below a series of knife blades 50. For illustrative purposes, let us assume that the blade thickness is .01 inch and the wafer finger width is .39 inch, with a distance between successive finger center lines of .40 inch. This spacing compares with a mold cross-section in which mold cavities a and b of a pair are separated from each other by a center line distance of .60 inch, comprising the two cavities for the molding of a single piece of the configuration of FIG. 1. Cavity b is separated from the next successive cavity a to the right by a center line distance of 1.00 inch so that the center line distance from one cavity a to the next succeeding cavity a is 1.60 inches. With a spacing between center lines of successive fingers of .40 inch, the spacing between successive mold cavities a thus conforms to the spacing between every fourth finger.

Thus, in the embodiment illustrated, the successive a cavities of each mold are filled at one shot by the ejection of every fourth wafer finger. For that purpose, the ejector dogs 320 and 322 (FIG. 18) are arranged at intervals along the ejector bar 336 corresponding to every fourth ejector pad, as shown in FIG. 17.

Immediately following ejection of every fourth finger into the a cavities of the mold positioned as shown, the next successive mold is moved into the same loading position and the drum is indexed axially by a distance equal to the center lines between successive ejector pads or .400 inch, rotation of cam 301 (FIG. 14) accomplishing this indexing motion. The dogs 322, 324 (FIGS. 17 and 18) do not, however, move with the drum during this axial indexing, and they thereby come into vertical alignment with the next succeeding pads. The next actuation of the ejector bar 336 then ensues and the a cavities for that mold are filled. This process is repeated for four successive molds. When the knives become empty on that face of the drum, the next mold is moved into position and the drum is retracted axially to its full line starting position of FIG. 12. It is also rotated 45 degrees to move the drum head now emptied, into the D position and to move the loaded head from the F position into lowermost ejecting position E.

A feature of my invention is the accuracy of deposit of the fingers in the mold cavities, for which purpose the mold should be in close proximity to the head E of the drum so that there is a minimum of free fall as the fingers leave the head and drop into the mold. FIG. 3 shows the molds at 20A and 20B in such close proximity, and for freedom of rotation of the drums between the filling operations it is necessary only to time the rotation to occur after a mold has been removed from filling position and before the next mold arrives.

SECOND EMBODIMENT

General layout of the machine

Figure 19:
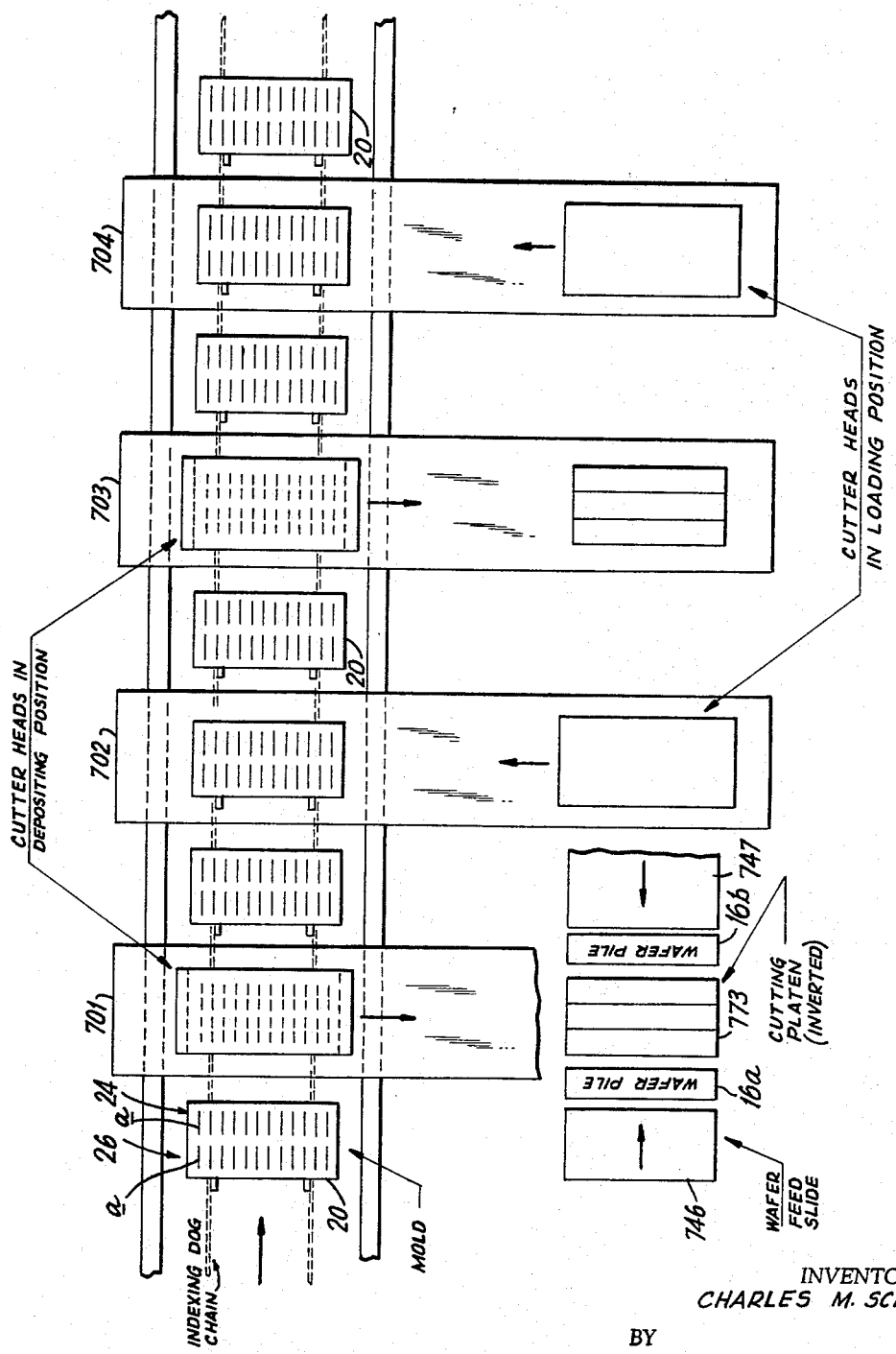
FIG. 19 is a simplified schematic plan view, with parts omitted suggesting the general layout of a second and preferred embodiment of my invention.

A second and preferred embodiment of my invention is shown in FIGS. 19 through 36. Referring to FIG. 19, the second embodiment has four wafer cutting and mold filling units 701, 702, 703 and 704. A series of wafer molds 20 is advanced along a line from unit 701 toward unit 704 at the mold loading side of the machine. The molds are indexed along the mold line by the same apparatus used in the first embodiment and its description is therefore omitted here. Each of the cutting and filling units extends perpendicularly to the mold line.

As will appear, the units operate in pairs. Units 701 and 703 perform the same operations at the same times in the cycle while units 702 and 704 function out of phase with the first two units to provide continuous loading of the molds. Wafer slabs 16a are fed to one side of the cutting platen of each unit while slabs 16b are fed to the other side of each platen. Unit 701 and unit 703 fill only the a cavities (see FIG. 2) in each mold while units 702 and 704 fill only the b cavities. Since the two sets of units operate sequentially, the cutter heads of two units are depositing wafers in the molds while the other two units are loading and cutting wafers.

When units 701 and 703 are discharging into the molds, cut fingers from slabs 16a fill the a cavities in row 26 while those from slabs 16b fill the a cavities in row 24. Similarly, slabs 16a fill the b cavities in row 26 and slabs 16b fill the b cavities in row 24 when units 702 and 704 are depositing. The four units are essentially duplicates and I shall therefore confine my description to unit 701 unless otherwise appropriate.

Each unit has a cutter head assembly containing a cutter head 705 (FIG. 20) on the face of which is mounted a series of parallel thin knife blades 706. The blades are spaced at intervals equal to the size of the finished wafer finger. A platen 773 is aligned below the cutter head when the head is in a wafer loading and cutting position and is designed to reciprocate vertically. The two wafer slabs 16a and 16b are loaded on this platen and when the platen reciprocates vertically are pressed upwards into the knife blades. The rubber platen pad 707 and knives therefore sever wafers into fingers of the desired size. The final cut pushes the wafer between the sharp knife edges and the platen pad leaving no kerf and a minimum of crumbs. The knives preferably do not remove material but displace it laterally so that the severed wafer fingers are compressed between the knife blades and thereby frictionally held.

When the spaces between the knife blade have been filled the platens move downward and the loaded cutter heads slide horizontally to the mold filling line. When the cutter heads reach the mold line, ejectors force out every fourth cut finger in each row into the cavities in the same general manner as in the first embodiment, as will appear. The molds then index one position while the cutter heads index perpendicularly to the mold line to align the next set of wafers. While two units discharge, the other two units are back at the loading line refilling.

The following is a description of the construction and operation of this embodiment of my invention.

1. MAIN DRIVE

Figure 20:
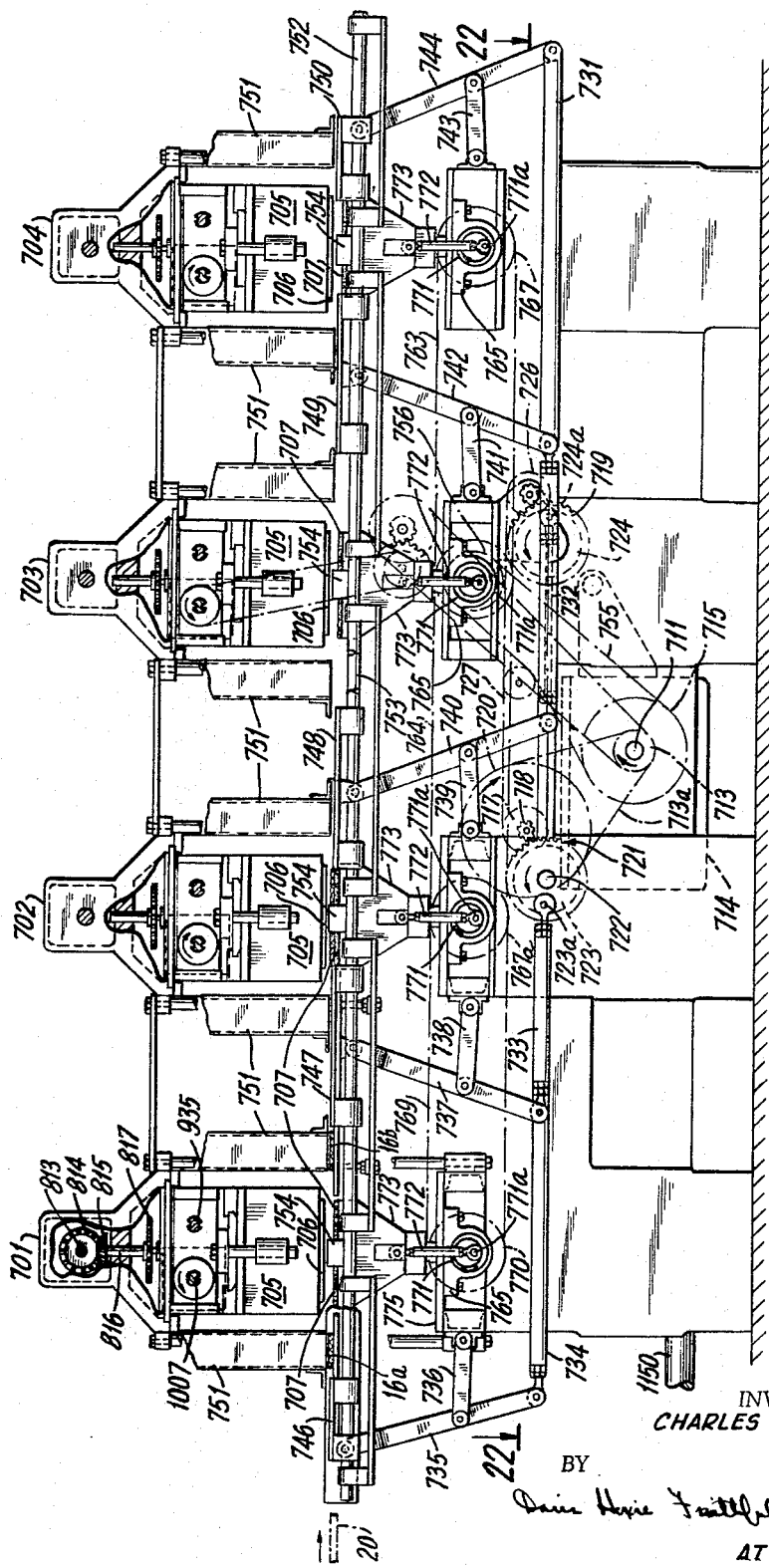
FIG. 20 is a detailed elevation view of the machine of FIG. 19 from the wafer loading side.
Figure 21:
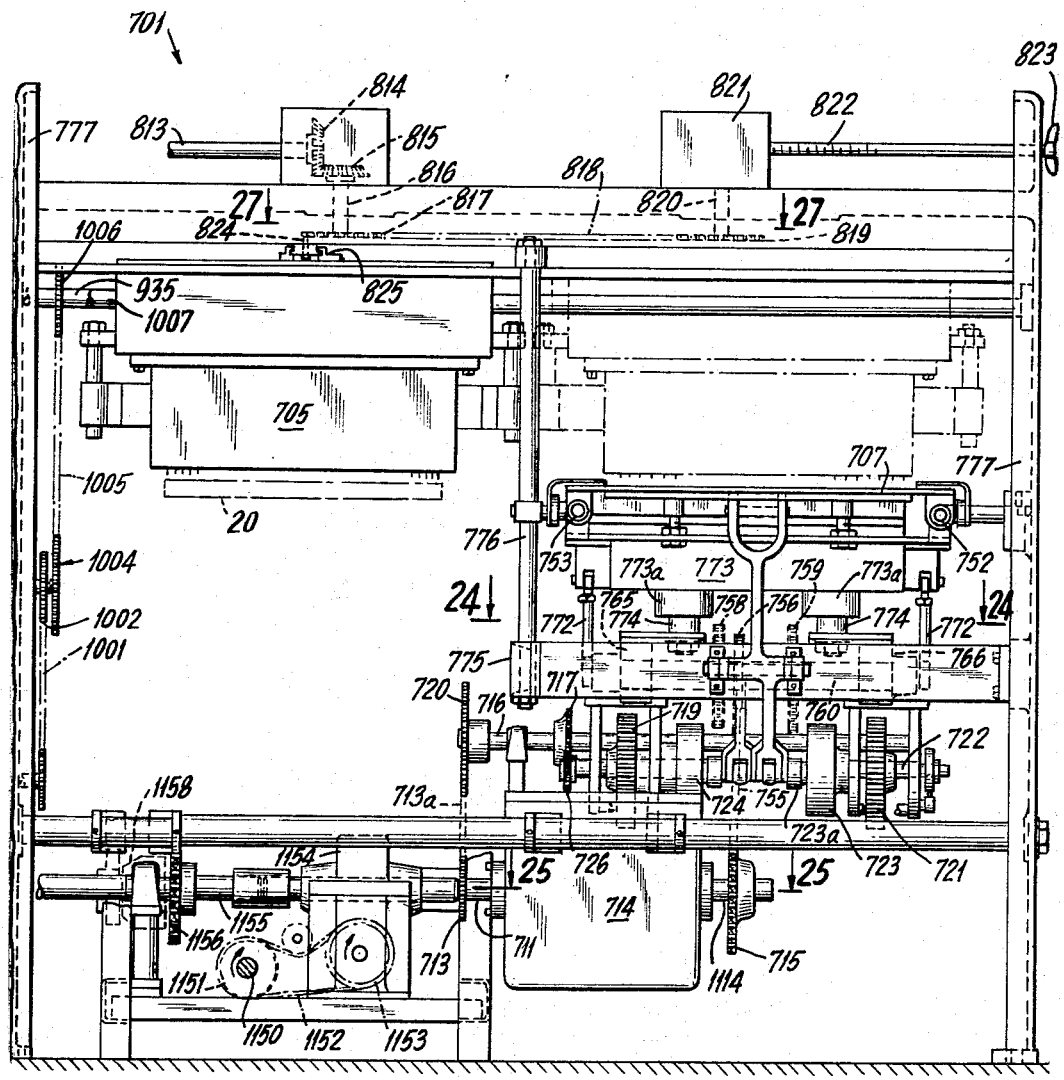
FIG. 21 is an end elevation view of FIG. 20 looking from the left side.

Referring to FIGS. 20, 21 and 34, the molding plant power line shaft 1150 passes longitudinally through the machine near the base. Sprocket 1153 is driven by a chain 1152 connected to sprocket 1151 fixed to shaft 1150. The driven sprocket 1153 powers a worm gear system 1154 of a conventional type which in turn powers a shaft 1155 carrying sprocket 1156. Sprocket 1156 makes one revolution for each index of the molds.

Sprocket 1157 is freely mounted on main shaft 711 of the cutting and filling machine. This sprocket is powered by chain 1159 from sprocket 1156. Sprocket 1157 is connected to the shaft 711 by a clutch arrangement 1158 designed so that the cutting and filling machine is always synchronized with the molds passing down the line. This clutch will engage on one position only, when synchronization is achieved. In addition, the clutch provides a means of closing down the cutting and filling plant without closing the entire mold line.

Shaft 711, as indicated, provides power take-offs for the different sections of the machine. Synchronization of the entire machine can therefore be achieved by properly relating the gear ratios of the various components to the main shaft 711 as will be indicated below.

2. WAFER FEED ASSEMBLY

Referring to FIGS. 20, 21, 22 and 23, sprocket 713 mounted on shaft 711 is connected by means of a chain 713a to sprocket 720. The latter sprocket is mounted on shaft 716. Sprocket 717 is also mounted on shaft 716 near sprocket 720 and gear 718 near the far end of the shaft. Gear 718 meshes with gear 721 on a parallel shaft 722. Shaft 722 is supported by means of bearings and has a crank 723, consisting of a disk and an adjustable eccentric stud 723a, mounted on the end of the shaft facing towards the center of the machine.

Sprocket 717 is connected by means of chain 727 to sprocket 726 on shaft 745. This shaft is connected by means of reduction gears 712 and 719 to crank 724 (FIG. 23) on shaft 729. By arrangement of the two cranks in this manner they will revolve 180° out of phase and when connected by further levers to the wafer slides will feed wafers onto each platen unit from both sides.

Eccentric stud 723a is pivotally connected to connecting rod 733. This rod is in turn connected at the opposite end to the lower end of lever 737 that imparts reciprocal movement to wafer slide 747. This wafer slide alternately feeds units 701 and 702 from wafer stacks 751 adjacent to each cutter head. A link 738 attached movably to the frame and an intermediate point of lever 737 pivots lever 737.

Lever 737 is connected to lever 742 by horizontal bar 732. Lever 742 is connected to wafer slide 749 which feeds units 703 and 704 alternately. Intermediate link 741 pivots lever 742. Wafer slides 747 and 749 therefore feed units 701 and 703 at the same time on one stroke and on the reverse stroke feed unit 702 and unit 704.

A similar arrangement of arms operated by crank 724 and stud 724a imparts reciprocal motion to wafer slides 746, 748 and 750. Rod 730 (FIG. 22) is connected at one end to stud 724a and at the other end to upwardly extending lever 740 which is in turn connected to wafer slide 748. Intermediate link 739 pivots lever 740.

Connecting rods 731 and 734 are movably attached to rod 730 at the same end of rod 730 as lever 740. These rods extend in opposite directions and serve to operate lever 735 and lever 744. Lever 735 reciprocates wafer slide 746 and lever 744 reciprocates the other end wafer slide 750. Intermediate links 736 and 743 pivot levers 735 and 744, respectively.

Guide bars 752 and 753 extend the length of the wafer loading and cutting platforms. These bars provide support for the wafer slides and position them vertically so that only one wafer is extracted from the wafer bins 751 per stroke and placed on platens 773 hereinafter described. Spring loaded blocks 754 in the center of each platen form a stop against which the slides push the wafers to position them under the cutting knives 706.

In operation the two cranks 723 and 724 revolve in opposite directions. The linkage from the two cranks therefore causes slides 746 and 747 to approach and load unit 701 simultaneously. At the same time that this is occurring, slides 748 and 749 are approaching and loading unit 703. Wafer slide 750 is at this time moving in an outward direction from unit 704. When the cutter heads of two units 701 and 703 have been loaded and moved to the mold filling line, units 702 and 704 return their cutter heads to the wafer cutting and loading line. The slides then act in the opposite direction and load units 702 and 704.

3. PLATEN DRIVE

Figure 26:
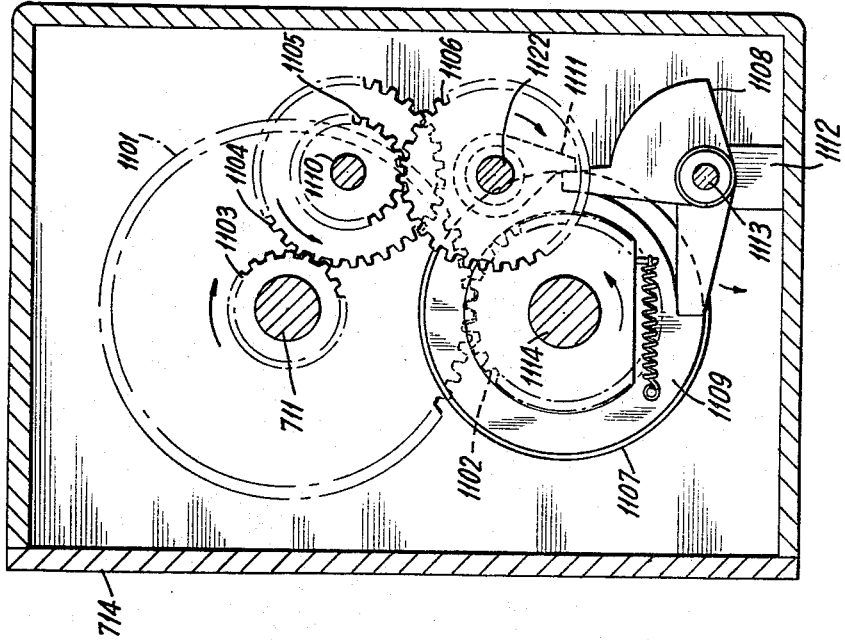
FIG. 26 is a vertical section on line 26—26 of FIG. 25.
Figure 25:
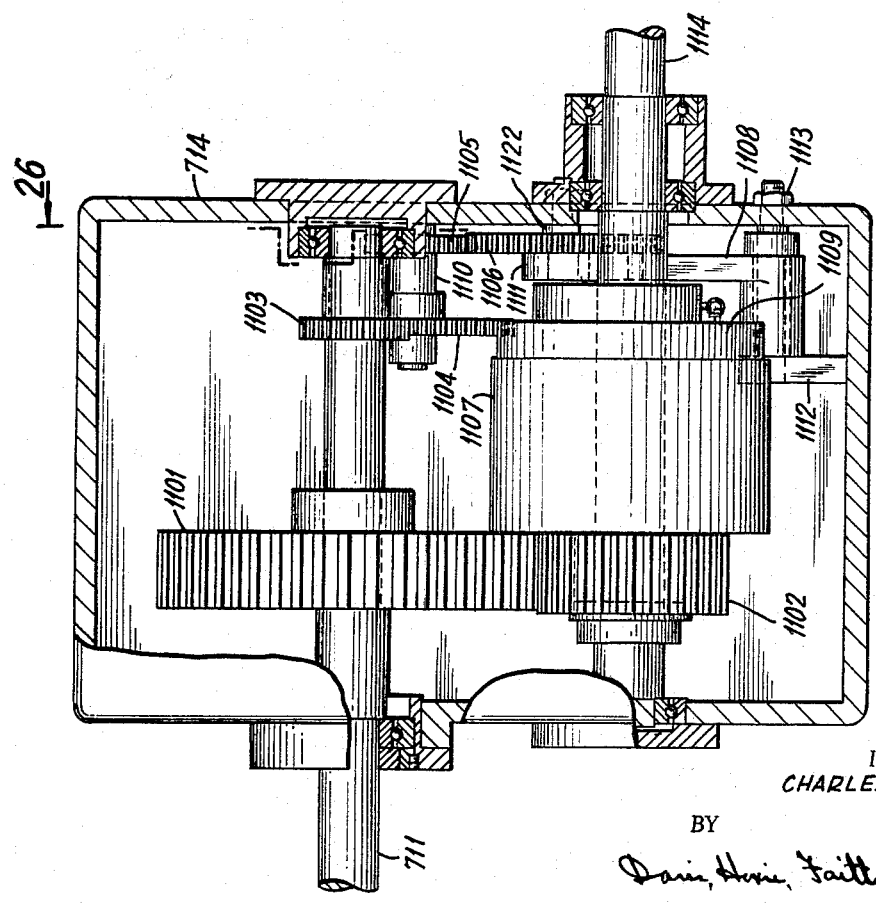
FIG. 25 is a horizontal section on line 25—25 of FIG. 21.

Referring to FIGS. 21, 25 and 26, the platen driving clutch and gear box 714 supports the main drive shaft 711. Mounted on shaft 711 within the gear box are two gears 1101 and 1103. Gear 1101 meshes with smaller gear 1102 mounted on a single revolution clutch on the output shaft. Gear 1102 is integrally connected to clutch housing 1107 and revolves continuously.

Gear 1103 on the input shaft 711 engages gear 1104 mounted on a stud shaft 1110 on which is also mounted gear 1105. Gear 1105 in turn engages gear 1106 rotatably mounted on stud shaft 1122. A trip lever 1111 is fixed to gear 1106 so that they rotate as a unit. Clutch pawl 1108 consisting of two arms 90° apart is rotatably mounted by means of nut and bolt 1113 and support 1112. The vertical arm of the clutch pawl is rotated by trip lever 1111. The horizontal arm of the clutch lock rests in a detent in clutch plate 1109 mounted on the face of the clutch. During the cycle the trip lever lifts the vertical arm disengaging the pawl from the detent and allowing clutch housing 1107 to engage the output shaft causing rotation. Clutch pawl 1108 is suitably counterbalanced so that it will return to an engaged position in the detent after each cycle. The gear arrangement in gear box 714 is designed so that the platens 773 will reciprocate once every four revolutions of main drive shaft 711. All four platens reciprocate simultaneously but only two are loaded with wafers at the proper time to charge the cutter heads in position to receive wafers.

Sprocket 715, attached to output shaft 1114 of gear box 714, is connected by chain 755 to sprocket 756 mounted below unit 703. Sprocket 756, shown in FIG. 24, is mounted on a rotatable shaft 760, supported by journals 765 and 766.

To sprockets 762 and 761 are mounted on shaft 760. Chains 763 and 764, disposed in a horizontal position, connect the two sprockets to the other two platen drives of units 702 and 704.

The platen drive for unit 704 (FIG. 20) is powered by chain 763 connected to sprocket 767 mounted on a shaft journaled on two bearings similar to bearings 765 and 766 of unit 703.

Power for the platen drive for unit 702 is supplied by chain belt 764 which engages a double sprocket 767a mounted on a shaft below unit 702. A second chain belt 769 from the latter sprocket transmits power to sprocket 770 fixed to a rotatable shaft mounted below unit 701 in a similar manner. Each of the rotatable shafts used to reciprocate the platens revolves in the same direction. Mounted at each end of each rotatable shaft is a crank 771. These cranks are mounted so that the stud 771a on each one will always be positioned to conform to the position of the other studs.

Attached rotatably to each stud is a connecting rod 772. The rods are pivotally mounted in slots on opposite sides of cutting platens 773. The cutting platens 773 are controlled in their reciprocal vertical movement by guide pins 774 fixed to frame assembly 775 (FIG. 21). Guide pins 774 engage linear bushings in bosses 773a of cutting platens 773. Pipe sections 776 and channels 777 additionally guide the vertical movement.

Mounted atop each cutting platen 773 is a resilient cutting pad 707 designed to prevent injury to knife blades during the final portion of the cut. This pad may be of rubber. A set of parallel sharp knives 706 are mounted on the underside of each cutter head 705 so that the knives will be aligned above the platen when in loading position.

In operation the cutting platens are arranged to reciprocate vertically when wafers are placed on them by the wafer slides. The upward motion of the platen presses the wafer against the knives, the details of which are the same as those on the first embodiment, and cuts the wafer into appropriate sized fingers. When the upward limit of the platen has been reached and the wafer is completely cut, the platen withdraws to its lowest position where it is ready for reloading. Friction retains the wafers between the knife blades during the movement to the mold filling line.

4. CUTTER HEAD SLIDE

Referring particularly to FIGS. 33, 35 and 36, an 8:1 ratio reducing worm gear drive 801 attached to main shaft 711 provides power to two power output shafts 802 and 803, which via couplings 802a and 803a rotate shafts 802b and 803b of indexing mechanisms 804 and 805. Each of the indexing mechanisms provide sequential power to shafts which in turn power means for sliding the cutter heads.

The indexing mechanisms 804 and 805 are geared to provide four revolutions of output for each four molds that pass followed by a period of dwell for the next four molds. The two indexing mechanisms are adjusted so that the opposite periods of the two units coincide. Unit 804 has two output heads 810 and 811 which rotate shafts 806 and 807, respectively, while unit 805 similarly provides rotation of shafts 806a and 807a.

Figure 27:
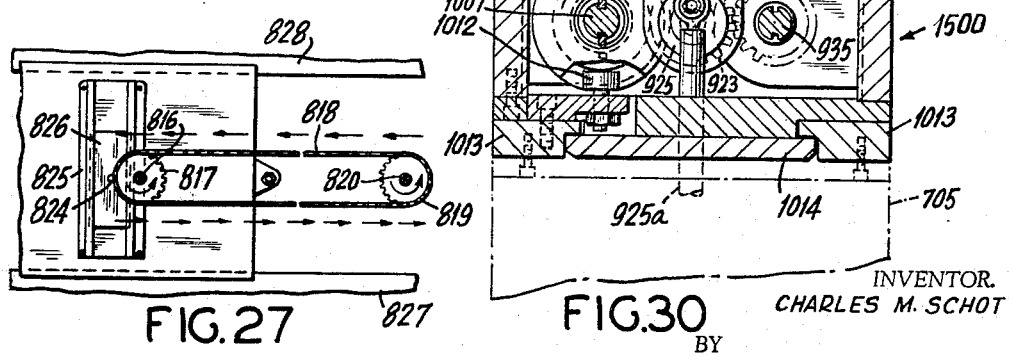
FIG. 27 is a horizontal section on line 27—27 of FIG. 21.
Figure 30:
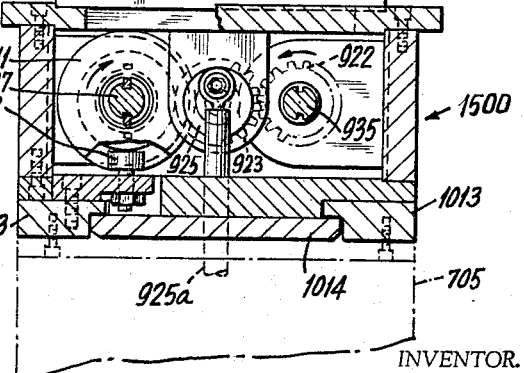
FIG. 30 is a vertical section on line 30—30 of FIG. 28.

Mounted at the top of each of the cutting and filling units is a gear box 812 attached to the output shafts of the indexing mechanism. This bevel gear box provides rotation to shaft 813. A further system of bevel gears 814, mounted on each shaft 813, and 815 secured to each vertical shaft 816, rotate shaft 816. Shaft 816 rotates in one direction only. Shaft 816 has a sprocket 817 mounted on its lower end which engages chain belt 818. The opposite end of chain belt 818 is mounted on sprocket 819 (FIGS. 21 and 27). Sprocket 819 is on a freely rotating shaft 820 affixed to block 821. A tensioning screw 822, adjustable by means of wing nut 823, maintains chain belt 818 in a taut condition.

Attached to the top of the slide head 1500 is a channel 825 (FIG. 29) having longitudinally grooved interior side walls, mounted perpendicularly to the line of the cutter head. Slideably mounted in the channel is a block 826 containing a tongue which mates with the channel. Rotatably mounted in block 826 and perpendicular to it is a pin 824. This pin is fixed to chain belt 818 so that the movement of the belt carries the pin and block assembly with it and thereby slides the cutter head assembly. The slide assembly is mounted slideably on two rails 827 and 828.

In operation the slide assembly moves intermittently. When two cutter heads are above the mold line the chain 818 stops due to the dwell in the indexing mechanism for a time sufficient to eject the four loads of fingers. The chain belt then moves again dragging the cutter heads to the wafer loading position. The other two units are moved in the opposite sequence.

5. WAFER DISCHARGE SYSTEM

When the cutter head, loaded with wafers, reaches the mold line the wafer discharge system functions and every fourth wafer is discharged. Successively each of the other wafers is discharged.

Figure 31:
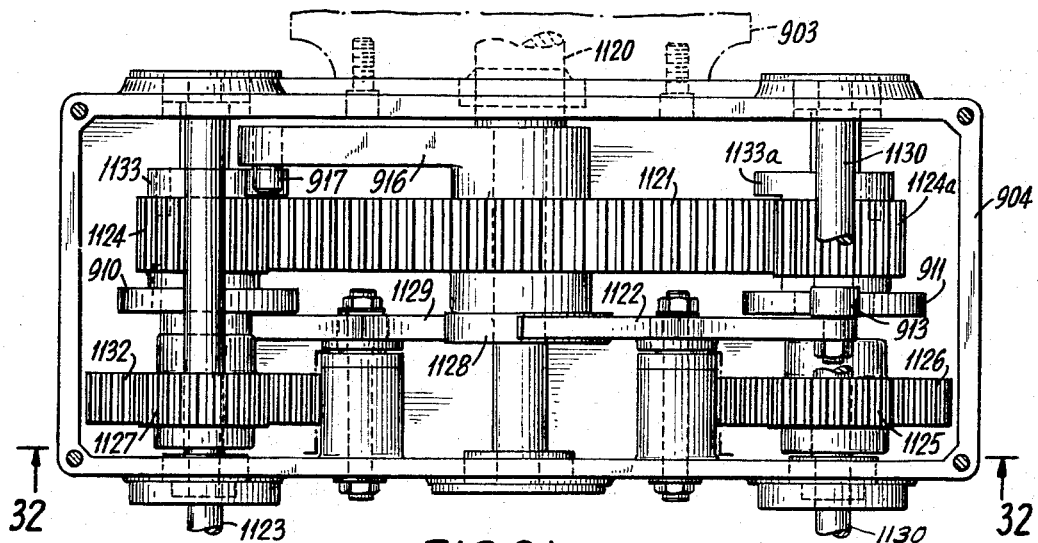
FIG. 31 is a horizontal section of the knock-out gear box.
Figure 32:
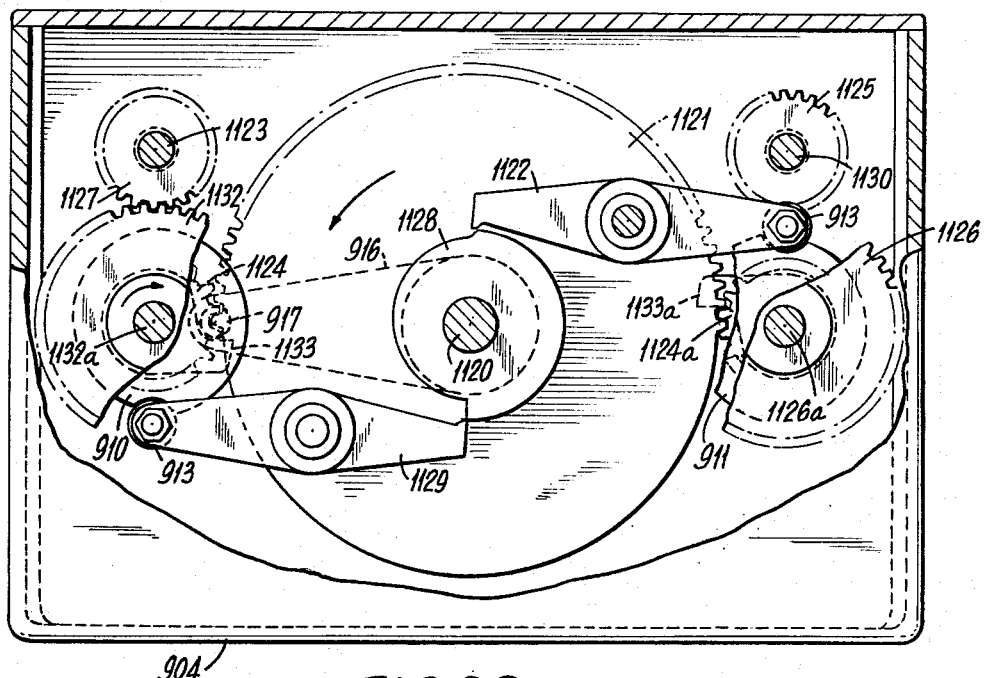
FIG. 32 is a horizontal section on line 32—32 of FIG. 31.

Referring to FIGS. 31, 32 and 33, the wafer discharge system receives its power from the main shaft 711. A bevel gear box 712' connects shaft 711 to shaft 902, which in turn powers index gear system 903. This index gear system is a conventional type and is designed to provide alternately 45° of output followed by a dwell of equal time of the shaft 1120 for each continuous revolution of power shaft 711.

The output shaft 1120 of the indexing mechanism provides power to alternating gear box 904. Attached to shaft 1120 within the gear box is a large gear 1121 containing teeth over only 180° of circumference. Mounted 180° apart on either side of gear 1121 are two small gears 1124 and 1124a which engage sequentially the teeth of gear 1121. These small gears are mounted on shafts 1132a and 1126a, respectively. Gears 1132 and 1126 are also mounted rigidly on these shafts and translate rotation to gears 1127 and 1125 mounted on the two output shafts 1123 and 1130 respectively.

A cam plate 1128 is rigidly affixed to shaft 1120 in front of gear 1121. This cam plate engages one end of two levers 1122 and 1129, pivoted so that rollers 913 on their free ends engage detents in plates 910 and 911, respectively. The detent plates serve to locate gears 1124 and 1124a so that they engage properly with intermittent gear 1121 as it revolves. To ensure the fact that gears 1124 and 1124a always engage gear 1121 in the same position, respective arms, 1133 and 1133a, are affixed to each gear. A pin 917 mounted in fixed relation to gear 1121 impinges on this lever during initial engagement of gear 1121 and gear 1124 and 1124a reducing the shock on the first tooth engaged. Each output shaft 1123 and 1130 rotates four times with an equal period of dwell between each revolution then dwells while the other output shaft rotates intermittently four times.

Mounted on the output shaft 1123 and 1130 are two sprockets 915 and 914, respectively. Chain belts 915a and 914a transmit the rotation to bevel gear boxes 919 and 918 mounted on units 701 and 702. Power for the wafer discharge system for units 703 and 704 is provided by means of shafts 919b and 918b which power bevel gear boxes 919a and 918a.

Figure 28:
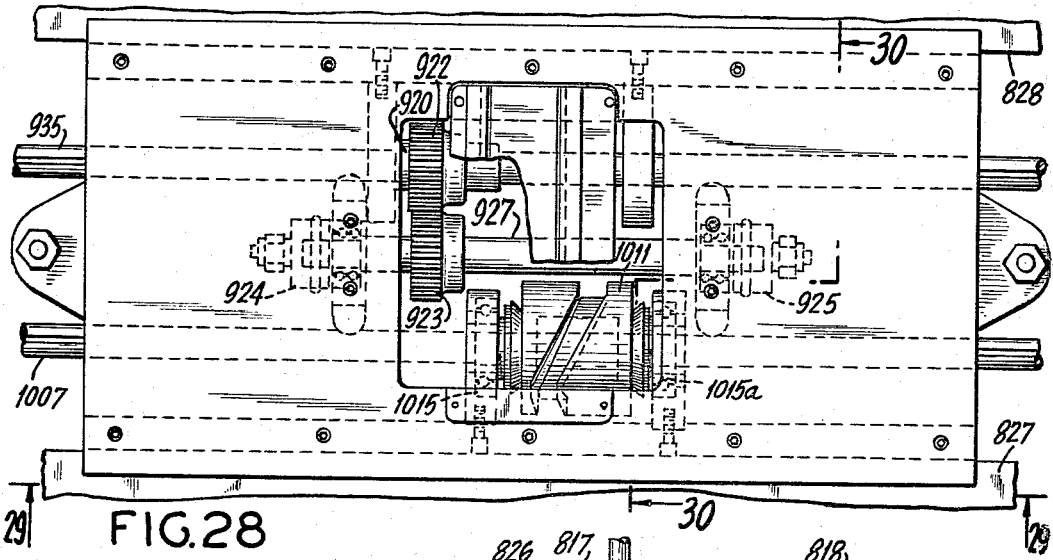
FIG. 28 is a plan view of the top of the cutter head assembly showing the slide mechanism.

The bevel gear boxes are mounted below the point of application of power for the wafer discharge system so that chain belts 930, 931, 932 and 933 are used to power sprocket 934 of each of the units. Sprockets 934 are in turn mounted on splined shafts 935. Mounted on a splined sleeve 920 in the slide head is gear 922 which rotates when the splined shaft rotates and is capable of sliding on the shaft (FIG. 28). This gear engages a second gear 923 mounted on shaft 927 parallel to sleeve 920. Shaft 927 has cranks 924 and 925 at each end. These cranks are, in turn, connected to rods 924a and 925a, respectively, which when functioning reciprocate vertically. The actual mechanism for pushing out the wafer fingers is connected to these reciprocating rods and is of the same type as described in the first embodiment.

In operation, two units are ejecting while the other two are loading wafers. Since the splined shaft 935 rotates sequentially only the discharge systems of the cutter heads over the mold line function. The discharge systems of the loading cutter heads remain inactive. The sequential gear arrangement permits this timing to be accomplished.

6. INDEXING MECHANISM

Figure 29:
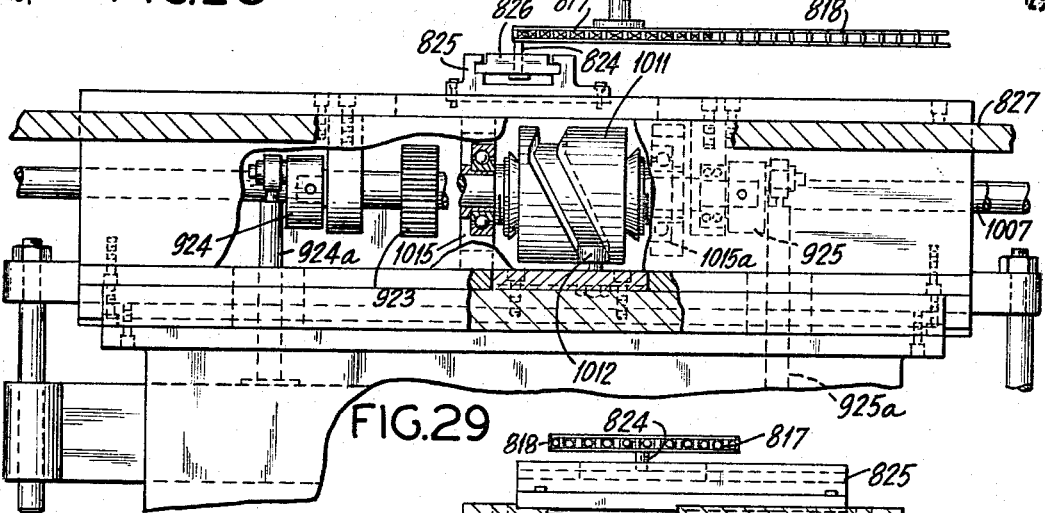
FIG. 29 is a vertical section on line 29—29 of FIG. 28.

The cutting head is adjusted so that when it reaches the mold line every fourth wafer will be over a cavity. In order to place the other wafers into the cavities of successive molds the head must be indexed perpendicularly to the mold line to permit alignment. Referring to FIGS. 21, 29 and 35, the indexing mechanism is powered by sprocket 1000 mounted on shaft 711.

Transmission chain 1001 revolves sprocket 1002 having a gear 1003 affixed to it. Sprocket-gear combination 1004 engages gear 1003, driving chain 1005, and sprocket 1006. Sprocket 1006 is rigidly mounted on a rotating spline shaft 1007 that runs the width of the machine and passes through the cutter head assembly. The outside end of shaft 1007 near the mold line enters a miter gear box 1008. This gear box, in combination with shaft 1009, running the length of the machine, operates three other gear boxes 1010. These in turn cause the spline shaft 1007 of each unit to revolve continuously.

Mounted inside the cutter head assembly on splined shaft 1007 between two bearing blocks 1015 and 1015a (FIG. 28) is a barrel cam 1011. A follower 1012 (FIG. 29) engages the slot in the cam and is affixed to the lower unit of the cutter head containing the cutting knives and wafers. The lower units of cutter heads 705 are supported from gibs 1013 (FIG. 30) which are connected to follower 1012 and slide on fixed center plate 1014. In operation the barrel cam contains a series of rises and dwells and displaces the cutter head assembly 705 with respect to slide head 1500 so that the selective wafer discharge pads are presented to the wafer discharge bar actuators in the same manner as in the first embodiment. At the same time that the slide and cutter head assembly are moving toward the wafer cutting and loading side of the machine the barrel cam in the slide begins to return the cutter head to its original position for making the first discharge. The barrel cam has a short dwell to coincide with the pause of the cutter head over the loading platform. As the cutter head advances to the mold line the barrel cam completes the return of the slide to its original position and the unit is now ready to eject the first series of fingers into the mold.

My invention, two embodiments of which have now been described, is subject to further modification and is not to be limited except as the appended claims require.

I claim:

1. In a machine for delivering to a mold cut portions of a slab of material, the combination of a knife blade support, a series of knife blades mounted in fixed spaced relation on said support with their cutting edges exposed, a platen perpendicular to the cutting edges, means for feeding a slab into cutting position between the platen and the cutting edges, means relatively moving the platen and the cutting edges to press the slab against the edges for cutting the slab and to force the cut portions into compressed position interposed between the blades, blocks interposed between the blades, means for selectively moving the blocks outwardly of the blades to eject therefrom cut portions interposed therebetween, and means for conveying the cut slab portions from the said cutting position into a position for ejection comprising means for moving the knife blades from one position to the other after the said cutting and prior to the said ejection.

2. In a machine for delivering to a mold cut portions of a slab of material, the combination of a cutter drum, polygonal in cross section, a plurality of series of knife blades, one series being disposed on each of the said sides of the drum, with their cutting edges outermost, means for periodically rotating the drum to move its faces successively into a predetermined cutting position, a magazine adjacent to but spaced from the drum for storing slabs to be cut, a slide adapted to bridge the space between the magazine and the series of blades on the face disposed in said cutting position, means for advancing the slide into bridging position and subsequently retracting the slide for freedom of movement of the drum upon its said periodic rotation, and means for advancing a slab from the magazine across the slide, in bridging position, and onto the blades in cutting position.

3. The machine as defined in claim 2 which also includes a platen movable relatively toward and away from the edges of the blades on the face disposed in said cutting position, a stop yieldingly mounted on the platen to protrude therefrom toward the blade edges to present stop means which the slabs abut upon being fed onto the blades, and means for actuating the platen to hold the platen away from the blades with the said stop means disposed in the path of movement of the slab advanced across the slide in bridging position, thereafter to move the platen toward the edges to press the slab between the knife blades and finally to retract the platen and stop means out of the path of movement of the drum upon said rotation.

4. In a machine for delivering to a mold cut portions of a slab of material, the combination of a series of parallel edged blades spaced at equal intervals from each other transversely of the edges, ejector blocks located between the blades and arranged in a series at intervals conforming to the said intervals of blade spacing, a plurality of actuators for the blocks arranged in a series spaced from each other at regular intervals constituting a multiple of the intervals at which the blocks are spaced and in actuating registry with predetermined selected blocks of the series, means for moving the actuators to operate the said selected ejectors in the series, and means to move the blocks and the actuators to position the actuators in registry with other blocks of the series for actuation thereof.

5. Apparatus for cutting a slab of material into pieces of individual size and depositing them in mold cavities to receive a coating, comprising a series of spaced substantially parallel knife blades, having their edges exposed and disposed in a common plane, a platen having a plane surface parallel to and exposed in proximity to the edges of the knife blades, means for depositing a slab between the knife edges and the platen, means for moving the platen into engagement with the slab and toward and into engagement with the edges for severing the slab into pieces of predetermined size while compressing the cut pieces into the spaces separating the blades, a mold having a series of cavities, the blades being arranged to present the cut pieces in a series at intervals different from the intervals separating the series of cavities in the mold but with the two series correlated in that preselected pieces of the series conform to the intervals separating selected cavities in the series, means for moving the blades from the position at which they are engaged by the platen to a position in which the said selected pieces are juxtaposed opposite the said selected cavities for registry therewith, means for ejecting the said selected pieces into said selected cavities, means for replacing the said mold with a second mold having cavities arranged as in the first mold, means for relatively shifting the blades and said empty mold to bring the next successive series of selected pieces in registry with the cavities of the empty mold corresponding with the cavities that had been filled in the first mold, and means for ejecting the said next series of selected pieces into the said cavities of said second mold.

6. The method of cutting slabs of material into pieces and depositing the cut pieces in molds having cavities arranged at predetermined intervals with respect to which at least two series of cavities may be selected, which comprises arranging the slabs in a plurality of groups, cutting the slabs of one group into pieces arranged at predetermined intervals differing from the intervals at which the cavities are spaced but with selected pieces of the group forming a series spaced at intervals equal to the spacing of one of said selected series of cavities, cutting the slabs of a second group into pieces arranged at the same predetermined intervals as the pieces of the first group but with selected pieces of the said second group forming a second series of pieces spaced at intervals equal to the spacing of another of said selected series of cavities, juxtaposing the first series of pieces opposite the first series of cavities and filling the first series of cavities therewith and juxtaposing the second series of pieces opposite the other series of cavities and filling the said other series of cavities therewith.

7. In a machine for delivering to a mold cut portions of a slab of material, the combination of means to sever the slab into a plurality of cut portions equally spaced from each other, means to convey the cut portions to a place of deposit while holding the equal spacing of the portions, and means to eject predetermined selected pieces for filling a mold having cavities spaced at intervals different from the intervals at which the pieces are spaced.

8. In a machine for delivering to a mold cut portions of a slab of material, the combination, with a mold having cavities arranged in a series of spaced pairs of means to divide the slabs into a plurality of groups of several slab portions, means to position the mold in proximity to one of said groups, means for depositing the severed slab portions of said one group into one cavity of each pair in the series, means thereafter to move the mold and another group of cut portions into proximity to each other and means filling the other cavity of each pair in the series from the latter group.

9. In a machine for delivering to a mold cut portions of a slab of material, the combination of a plurality of cutter heads having plane lower sides, a series of knife blades disposed on each of said plane lower sides with their cutting edges outermost, a platen movable relatively toward and away from the edges of the blades, a stop yieldingly mounted on the platen to protrude therefrom toward the blade edges to present stop means which the slabs abut upon being fed onto the platen, a magazine adjacent to but spaced from the cutter head for storing slabs to be cut, a slide adapted to move the slabs from the magazine onto the platen, means for advancing the slide into loading position and subsequently retracting the slide for reloading and means for selectively discharging the cut slabs from the knife blades.

10. A machine as defined in claim 9 which also includes means for moving the cutter head from a position above the platen to a different position for depositing the cut slabs.

11. In a machine for cutting a slab of frangible material into pieces of individual size, a cutter head having a series of blades arranged with their exposed edges in a common plane, a pad in the form of a block disposed between each pair of adjacent blades of the series presenting a supporting surface in proximity with the plane of the knife edges, a platen having a knife edge engaging surface, parallel with the plane of the edges, made of a cushioned material into which the blades can sink when the platen is pressed thereagainst in cutting the slab, yieldable mountings for the pads by which the pads afford yieldable support for the cut material between the knives during the cutting operation, means to move the platen and the cutting edges relatively toward each other to press a slab positioned between the platen and the cutting edges against the edges to cut the slab and to force the cut portions into interposed position frictionally held between the blades, means for moving the blades to convey the cut slab portions held therebetween to a position for deposit and means to selectively advance the yieldable mountings outwardly of the blades to eject the cut slabs held therebetween.

12. In a machine for delivering to a mold cut portions of a slab of material, the combination of a series of knife blades mounted adjacent each other with their cutting edges exposed, a platen having a surface perpendicular to the cutting edges, means to move the platen and the said cutting edges relatively toward each other to press a slab deposited therebetween against the edges to cut the slab and to force the cut portions of the slab into the interposed position compressed between the blades, blocks interposed between the blades having faces disposed in proximity to the knife edges for engaging portions of the slab as the slab is cut, means yieldably supporting the blocks and thereby the slabs against the pressure of the platen during the cutting, means for moving the blades for conveying the cut slab portions held therebetween to a position for deposit, and means thereafter for selectively advancing the blocks outwardly of the blades to eject the cut slab portions held therebetween.

13. In a machine for delivering to a mold cut portions of a slab of material, the combination of a plurality of cutter heads having plane lower sides, a series of knife blades disposed on each of said plane lower sides with their cutting edges outermost, a platen movable relatively toward and away from the edges of the blades, means for relatively moving the platen and cutting edges for severance of the slab, a stop yieldingly mounted on the platen to protrude therefrom toward the blade edges to present stop means which slabs abut upon being fed onto the platen, a magazine adjacent to but spaced from the cutter head for storing slabs to be cut, a slide adapted to move the slabs from the magazine onto the platen, means for advancing the slide into loading position and subsequently retracting the slide for reloading, means for selectively discharging the cut slabs from the knife blades, means for moving the cutter head from a position above the platen to a different position for depositing the cut slabs, means to load one-half of the cutter heads with slabs, and means to deposit the slabs simultaneously from the remainder of the cutter heads into the molds.

References Cited by the Examiner

UNITED STATES PATENTS

| 29,295 | 7/1860 | Marsh | 107—69 |
|---|---|---|---|
| 62,628 | 3/1867 | Harriman | 107—69 |
| 870,249 | 11/1907 | Patterson | 107—69 |
| 1,003,965 | 9/1911 | Kennedy | 83—569 X |
| 1,379,420 | 5/1921 | Sawyer | 83—620 X |
| 1,560,794 | 10/1925 | Furber | 83—620 X |
| 2,015,066 | 9/1935 | Cummings | 83—566 X |
| 3,101,021 | 8/1963 | Johnson | 83—99 |

WALTER A. SCHEEL, *Primary Examiner.*

J. D. BEIN, ROBERT E. PULFREY, *Examiners.*

J. SHEA, *Assistant Examiner.*

UNITED STATES PATENT OFFICE
CERTIFICATE OF CORRECTION

Patent No. 3,288,089    November 29, 1966

Charles M. Schott

It is hereby certified that error appears in the above numbered patent requiring correction and that the said Letters Patent should read as corrected below.

Column 12, line 27, before "position" insert -- lowers from its retracted position to its intermediate --; column 14, line 54, for "blade" read -- blades --; column 18, line 1, strike out "of the" and insert instead -- on --.

Signed and sealed this 12th day of September 1967.

(SEAL)
Attest:

ERNEST W. SWIDER
Attesting Officer

EDWARD J. BRENNER
Commissioner of Patents